(12) United States Patent
Lam et al.

(10) Patent No.: US 12,477,601 B1
(45) Date of Patent: Nov. 18, 2025

(54) AUTOMATED TEMPORARY DEVICE CONNECTIVITY

(71) Applicant: Amazon Technologies, Inc., Seattle, WA (US)

(72) Inventors: Kent V Lam, Diamond Bar, CA (US); Samer A. Sarhan Hussein, Rancho Santa Margarita, CA (US); Apoorv Naik, Carlsbad, CA (US); Jnana Prasanna Panuganti, Oakville (CA)

(73) Assignee: Amazon Technologies, Inc., Seattle, WA (US)

( * ) Notice: Subject to any disclaimer, the term of this patent is extended or adjusted under 35 U.S.C. 154(b) by 341 days.

(21) Appl. No.: 18/212,563

(22) Filed: Jun. 21, 2023

(51) Int. Cl.
*H04W 76/14* (2018.01)
*G06Q 50/12* (2012.01)
*H04M 1/72409* (2021.01)
*H04W 12/50* (2021.01)
*H04W 12/63* (2021.01)

(52) U.S. Cl.
CPC ............ *H04W 76/14* (2018.02); *G06Q 50/12* (2013.01); *H04M 1/72409* (2021.01); *H04W 12/50* (2021.01); *H04W 12/63* (2021.01)

(58) Field of Classification Search
CPC ..... H04W 76/14; H04W 12/63; H04W 12/50; H04M 1/72409; G06Q 50/12
See application file for complete search history.

(56) References Cited

U.S. PATENT DOCUMENTS

| | | | |
|---|---|---|---|
| 11,889,570 B1* | 1/2024 | Naik | H04W 76/14 |
| 2008/0220878 A1* | 9/2008 | Michaelis | A63F 13/31 |
| | | | 463/43 |
| 2010/0255782 A1* | 10/2010 | Klemmensen | H04N 21/43637 |
| | | | 455/41.2 |
| 2017/0085651 A1* | 3/2017 | Harrison | H04L 63/029 |
| 2017/0303326 A1* | 10/2017 | Kwon | H04W 8/005 |
| 2018/0098367 A1* | 4/2018 | Pezdirc | H04W 76/14 |
| 2018/0368198 A1* | 12/2018 | Boushley | H04W 4/023 |
| 2019/0124701 A1* | 4/2019 | Mcclellan | G16H 15/00 |
| 2020/0314926 A1* | 10/2020 | Chen | H04W 76/14 |
| 2022/0361265 A1* | 11/2022 | Alexander | H04W 12/63 |
| 2022/0394793 A1* | 12/2022 | Rakshit | H04W 12/55 |
| 2023/0038849 A1* | 2/2023 | Perumalla | H04W 76/14 |
| 2024/0322861 A1* | 9/2024 | Zhang | H04W 76/14 |

\* cited by examiner

*Primary Examiner* — Ariel A Balaoing
(74) *Attorney, Agent, or Firm* — Nicholson De Vos Webster & Elliott LLP

(57) ABSTRACT

Systems and methods for automated temporary device connectivity include receiving data requesting that a first device be associated with a second device and generating a request for an identifier of the second device to be associated with the first device. This request may be sent to an enterprise system and the second identifier may be received from the enterprise system. Data authorizing the first identifier to be associated with the second identifier for pairing purposes may be generated and stored. An indication may be received that the first device has moved within a threshold range of the second device and commands may be sent to cause the first device and the second device to enter a pairing mode.

20 Claims, 10 Drawing Sheets

AUTOMATED TEMPORARY DEVICE CONNECTIVITY

BACKGROUND

Devices, including voice interface device, have become available. Some of these devices may be utilized to perform actions in environments.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
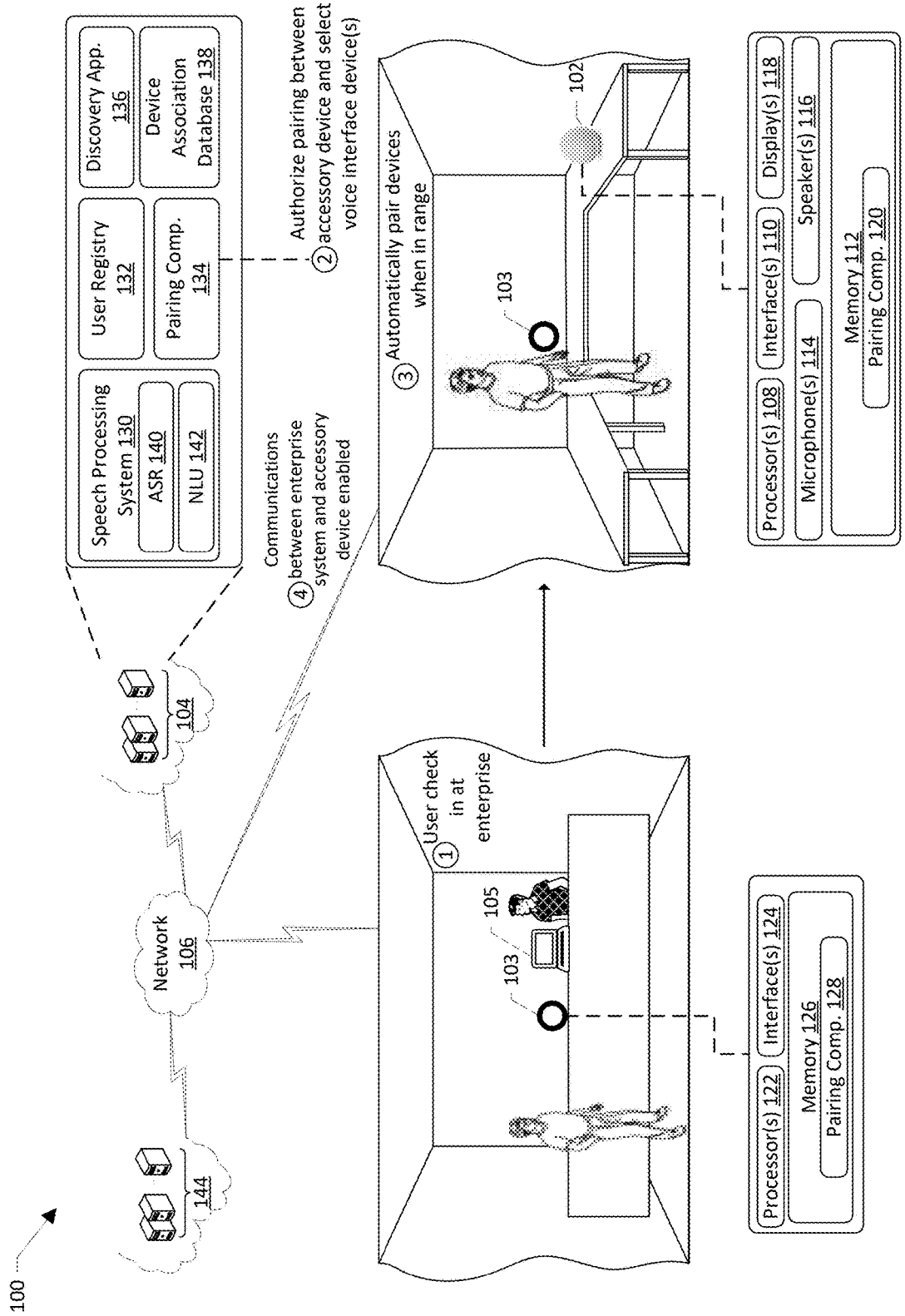
FIG. 1 illustrates a schematic diagram of an example environment for automated temporary device connectivity.

Systems and methods for automated temporary device connectivity are disclosed, among other things. Take, for example, an environment (such as a home, hotel, vehicle, office, store, restaurant, or other space) where one or more users may be present. The environments may include one or more electronic devices that may be utilized by the users or may otherwise be utilized to detect and/or control conditions associated with the environments. For example, the electronic devices may include voice interface devices (e.g., smart speaker devices, mobile phones, tablets, personal computers, televisions, appliances like refrigerators and microwaves, etc.), graphical interface devices (e.g., televisions, set top boxes, virtual/augmented reality headsets, etc.), wearable devices (e.g., smart watch, earbuds, healthcare devices), transportation devices (e.g., cars, bicycles, scooters, etc.), televisions and/or monitors, smart thermostats, security systems (including motion sensors and open/close sensors, including sensors that indicate whether a security system is armed, disarmed, or in a "home mode"), smart cameras (e.g., home security cameras), and/or touch interface devices (tablets, phones, steering wheels, laptops, kiosks, billboard, other devices with buttons, etc.). These electronic devices may be situated in a home, in a place of business, healthcare facility (e.g., hospital, doctor's office, pharmacy, etc.), in a vehicle (e.g., airplane, truck, car, bus, etc.) in a public forum (e.g., shopping center, store, etc.), and/or at a hotel/quasi-public area, for example. As used herein, "accessory devices" may be electronic devices that are to be paired with other devices and generally are configured to be taken in and out of environments. Also as used herein, "voice interface devices" may be electronic devices that the accessory devices are paired to and generally are configured to be disposed within the environments.

In examples, it may be advantageous to pair an accessory device to a voice interface device without requiring a user of the accessory device to manually pair the devices. Automated pairing of devices may become complex and more difficult to achieve in an enterprise scenario (e.g., a hotel, a work environment, a rental car, etc.) where the device pairing may be intended to be temporary, such as while a user stays at a given hotel but then not after the user checks out from the hotel, or while a user rents a car but then not after the user returns the rental car. In these and other examples, automated temporary device pairing may be performed utilizing the systems and methods described herein.

To do so, in examples, a trigger event may be determined for associating a given voice interface device with a given accessory device. Utilizing a hotel enterprise as a nonlimiting example, a user may have reserved a room at a hotel. During a check in process, the user may check in for the reserved room, receive keys and/or key codes to enter the room, and/or may otherwise be engaged in acquiring entry to the hotel room. In some examples, the user may have an accessory device that is associated with the hotel enterprise, with voice interface devices located in the hotel rooms, and/or with other systems that are associated with the enterprise system of the hotel. In a nonlimiting example, a front-desk clerk or other employee of the enterprise system may assist the user with the check in process and as part of that process may scan or otherwise acquire a device identifier for the accessory device at issue. The device identifier may be associated with the environment (here the hotel room) that the user is associated with. It should be understood that other ways of acquiring the device identifier of the accessory device may also, or alternatively, be used.

Once the device identifier is associated with the environment at issue, a device utilized by the enterprise system employee may send data representing a check in event to the enterprise system, which in examples may be remote from the device that the employee is utilizing. The enterprise system may receive the check in event and may send the check in event to a system associated with the voice interface devices. A pairing component of the system may receive the check in event and may initiate processes for determining which voice interface device(s) are to be associated with the user while the user is staying at the hotel and authorizing the accessory device to be paired with those voice interface device(s). For example, the pairing component may send a discovery request for the device identifiers of the voice interface device(s) to a discovery application. The discovery application, which may also be referred to herein as a discovery skill, may be an application that was developed in association with the enterprise system for at least pairing purposes and generally for other purposes as well, such as determining responses to voice commands received at the voice interface device(s) associated with the enterprise system. The discovery application may receive the discovery request, which may include the device identifier of the accessory device. The discovery application may utilize the discovery request to generate a query for association data from the enterprise system. The query for association data may include a request for the device identifiers of the voice interface device(s) that the user is authorized to be associated with during the user's stay at the hotel. In examples, these authorized voice interface device(s) may be the voice interface device(s) that are situated within the hotel room that the user reserved, conference rooms that the user has booked, and/or voice interface device(s) located in environments that the user has an association with.

The enterprise system may return the requested association data to the discovery application. The association data may indicate the device identifiers of the authorized voice interface device(s) as well as, in examples, details associated with the authorization. These details may indicate restrictions and/or limits on how the accessory device is authorized to be associated with the voice interface device(s), such as time limits for the authorization, conditions that are to be detected before pairing can occur, etc. The discovery application may generate a discovery response to the discovery request that includes the device identifiers of the voice interface device(s) and the details associated with authorization of the voice interface device(s), when known. The pairing component may receive the discovery response and may generate an association between the device identifier of the accessory device with the device identifiers of the voice interface device(s) in a device association database maintained by the system. The device association database may indicate authorized associations between accessory devices and voice interface devices for at least pairing purposes as described herein. At this point, automated temporary device pairing may be authorized for the specific accessory device at issue and the specific voice interface device(s) at issue, and this authorization for automated temporary device pairing may be performed prior to the user entering the environment with the voice interface device(s) or otherwise before a user would typically interact with the voice interface device(s).

At some point thereafter, the user may move to the environment with the voice interface device(s). In the hotel example, the user may move from a front desk area of the hotel to the room that the user reserved for the user's stay at the hotel. As the user moves, the accessory device may be configured to emit a beacon or otherwise a signal that identifies the accessory device and may be received by voice interface device(s). In examples, the beacon may be sent utilizing a short range communication protocol such as Bluetooth®, Bluetooth Low Energy® (BLE), etc. When the accessory device moves to within a threshold distance of a given voice interface device, the voice interface device may receive the beacon. Several examples of threshold distances are provided below, but generally the threshold distance may be a distance associated with the environment in which the voice interface device is situated, such as when a user enters the hotel room, when a user enters a rented car, when a user enters a given conference room, when a user enters a certain area of a working environment, etc. When the voice interface device receives the beacon from the accessory device, the voice interface device may generate and send a beacon event to the pairing component of the system. The beacon event may include the device identifier of the accessory device as well as the device identifier of the voice interface device that received the beacon. The pairing component may determine whether the accessory device is authorized to pair with the voice interface device based at least in part on whether an association between the accessory device and the voice interface device is present in the device association database. When authorized, the pairing component may generate and send a pairing command to the accessory device (which may be sent directly to the accessory device and/or to the accessory device via one or more other devices, such as the voice interface device and/or internet-based access points, for example). The pairing command may cause the accessory device to enter a pairing mode where the accessory device is caused to transmit a pairing request that is configured to be received by devices within a given range of the accessory device. Additionally, the pairing component of the system may send a pairing command to the voice interface device. The pairing command sent to the voice interface device may cause the voice interface device to enter the pairing mode as well, but the pairing mode of the voice interface device may be associated with receiving pairing requests (as opposed to transmitting pairing requests) from devices that are within a given range of the voice interface device. The pairing command sent to the voice interface device may also indicate the device identifier of the accessory device that is authorized for automated temporary device pairing.

With both the accessory device and the voice interface device in a pairing mode, the voice interface device may receive the pairing request from the accessory device, determine that the device identifier of the accessory device as received in the pairing request corresponds to the device identifier authorized by the pairing component, and may perform processes to establish a paired connection as between the accessory device and the voice interface device. When the connection is established as between the accessory device and the voice interface device, the voice interface device may maintain the device identifier of the accessory device in a list of paired devices. Once paired, the voice interface device may send a pairing acknowledgement indicating that the pairing was performed successfully to the system, which may communicate the pairing to the enterprise system along with data to enable the enterprise system to communicate with the accessory device while the accessory device is paired to the voice interface device. By so doing, the enterprise system may communicate with the accessory device directly and/or via the voice interface device.

At some point after device pairing occurs, a dissociation event may be detected indicating that the accessory device is to be dissociated from the voice interface device or otherwise the paired connection as between the accessory device and the voice interface device is to be undone. Using the hotel example, the user may check out of the user's room and the enterprise system may send a check out event to the pairing component of the system. The pairing component may receive the checkout event and may cause the device association database to remove the association between the accessory device and the voice interface device. Additionally, the pairing component may send a command to the voice interface device that causes the voice interface device to remove the device identifier of the accessory device from the list of paired devices as maintained by the voice interface device. This may cause the voice interface device to no longer acknowledge the accessory device as a paired and authorized device. Additionally, the pairing component may send a command to the accessory device that may cause the accessory device to reset itself to a state that the accessory device was in prior to pairing with the voice interface device. In examples, this state may be a factory reset state. By so doing, the accessory device may revert to a state where it may be configured to pair with other devices, the voice interface device may no longer be configured to communicate with the accessory device, and the system may accurately maintain data for determining what device pairings are authorized. In total, the automated temporary device pairings described herein allow for a user to, in examples, move an accessory device to within a threshold distance of an authorized voice interface device and the accessory device may be paired to the voice interface device without requiring user input data from the user. Also, the accessory device may be dissociated from the voice interface device when the user is dissociated from the environment and again without user input data from the user.

It should be understood that while multiple examples include the automated temporary device connection as between a given accessory device and a given voice interface device, this disclosure includes the ability to pair multiple accessory devices with a given voice interface device and/or the ability to pair an accessory device with multiple voice interface devices. Additionally, as noted above, while examples described herein include hotel-based examples, any enterprise system where automated temporary device connections may be desirable may be utilized. By way of nonlimiting example, a rental car enterprise system may be associated with the systems and methods described herein to authorize device pairings when a user rents a given car, and then pairings between the rented vehicle and a user device such as a phone may be automatically performed when the user brings the phone to within a threshold distance of the rented vehicle. Upon conclusion of the rental car term and/or when the user returns the rental car, dissociation of the phone from the rental vehicle may be performed.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example environment 100 for automated temporary device connectivity. The environment 100 may include, for example, a voice interface device 102 (also described herein as voice enabled devices) and one or more accessory devices 103. In certain examples, the accessory devices 103 themselves may be any one or more of a voice enabled device (e.g., smart speaker devices, mobile phones, tablets, personal computers, etc.), a video interface device (e.g., televisions, set top boxes, virtual/augmented reality headsets, etc.), and/or a touch interface device (tablets, phones, laptops, kiosks, billboard, etc.). In some examples, the devices may be situated in a home, place of business, healthcare facility (e.g., hospital, doctor's office, pharmacy, etc.), in a vehicle (e.g., airplane, truck, car, bus, etc.), and/or in a public forum (e.g., shopping center, store, hotel, etc.), for example. The devices may be configured to send data to and/or receive data from a system 104, such as via a network 106. It should be understood that where operations are described herein as being performed by the system 104, some or all of those operations may be performed by the devices. It should also be understood that anytime the system 104 is referenced, that system may include any system and/or device, whether local to an environment of the devices or remote from that environment. Additionally, it should be understood that a given space and/or environment may include numerous devices. It should also be understood that when a "space" or "environment" is used herein, those terms mean an area of any size and delineation and can include but are not necessarily limited to a given room, building, or other structure, unless otherwise specifically described as such.

The voice interface device 102 may include one or more components, such as, for example, one or more processors 108, one or more network interfaces 110, memory 112, one or more microphones 114, one or more speakers 116, and/or one or more displays 118. The microphones 114 may be configured to capture audio, such as user utterances, and generate corresponding audio data. The speakers 116 may be configured to output audio, such as audio corresponding to audio data received from another device. The displays 118 may be configured to display images corresponding to image data, such as image data received from the system 104. The voice interface device 102 may be configured to detect an environmental condition associated with the accessory devices 103 and/or the environment associated with the accessory devices 103. Some example sensors that may be utilized to detect conditions may include one or more microphones configured to capture audio associated with the environment in which the device is located, one or more cameras configured to capture images associated with the environment in which the device is located, one or more network interfaces configured to identify network access points associated with the environment, global positioning system components configured to identify a geographic location of the devices, Bluetooth and/or other short-range communication components configured to determine what devices are wirelessly connected to the device, device-connection sensors configured to determine what devices are physically connected to the device, user biometric sensors, and/or one or more other sensors configured to detect a physical condition of the device and/or the environment in which the device is situated. In addition to specific environmental conditions that are detectable by the sensors, usage data and/or account data may be utilized to determine if an environmental condition is present. In some examples, the sensors may also include radar and/or ultrasonic sensors. The memory 112 may include a pairing component 120, which will be described in more detail below by way of example.

The accessory device 103 may include one or more components, such as one or more processors 122, one or more network interfaces 124, and memory 126. The memory 126 may include components such as a pairing component 128. The pairing component 128 will be described in more detail below by way of example. The accessory device 103 may also include components and functionality that may allow the accessory device 103 to perform actions associated with its purpose. For example, the accessory device 103 may include components configured to cause the accessory device 103 to vibrate, to emit light, to output audio, to present images, etc. Examples of accessory devices 103 may be wearable devices of any type, a phone, a watch, components of a vehicle, and/or any other computing device.

It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 106 and to communicate with other devices in the environment 100. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices.

The system 104 may include components such as, for example, a speech processing system 130, a user registry 132, a pairing component 134, a discovery application 136, and/or a device association database 138. It should be understood that while the components of the system 104 are depicted and/or described as separate from each other in FIG. 1, some or all of the components may be a part of the same system. The speech processing system 130 may include an automatic speech recognition component (ASR) 140 and/or a natural language understanding component (NLU) 142. Each of the components described herein with respect to the system 104 may be associated with their own systems, which collectively may be referred to herein as the system 104, and/or some or all of the components may be associated with a single system. Additionally, the system 104 may include one or more applications, which may be described as skills. "Skills," as described herein may be applications and/or may be a subset of an application. For example, a skill may receive data representing an intent. For example, an intent may be determined by the NLU component 142 and/or as determined from user input via a computing device. Skills may be configured to utilize the intent to output data for input to a text-to-speech component, a link or other resource locator for audio data, and/or a command to a device, such as the smart devices. "Skills" may include applications running on devices, such as the smart devices, and/or may include portions that interface with voice user interfaces of smart devices.

In instances where a voice-enabled device is utilized, skills may extend the functionality of accessory devices 103 that can be controlled by users utilizing a voice-user interface. In some examples, skills may be a type of application that may be useable in association with target devices and may have been developed specifically to work in connection with given target devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device and send data and/or instructions associated with the input to one or more other devices.

Additionally, the operations and/or functionalities associated with and/or described with respect to the components of the system 104 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

With respect to the system 104, the user registry 132 may be configured to determine and/or generate associations between users, user accounts, environment identifiers, and/or devices. For example, one or more associations between user accounts may be identified, determined, and/or generated by the user registry 132. The user registry 132 may additionally store information indicating one or more applications and/or resources accessible to and/or enabled for a given user account. Additionally, the user registry 132 may include information indicating device identifiers, such as naming identifiers, associated with a given user account, as well as device types associated with the device identifiers. The user registry 132 may also include information indicating user account identifiers, naming indicators of devices associated with user accounts, and/or associations between devices, such as the smart devices. The user registry 132 may also include information associated with usage of the smart devices. It should also be understood that a user account may be associated with one or more than one user profiles. It should also be understood that the term "user account" may be used to describe a set of data and/or functionalities associated with a given account identifier. For example, data identified, determined, and/or generated while using some or all of the environment 100 may be stored or otherwise associated with an account identifier. Data associated with the user accounts may include, for example, account access information, historical usage data, device-association data, and/or preference data. The user registry 132 may also include data indicating enterprise identifiers for the enterprises described herein as well as which device identifiers are associated with the enterprise identifiers and/or which enterprise type models and/or fully customized enterprise-specific models are associated with the enterprise identifiers.

The speech-processing system 130 may be configured to receive audio data from the voice interface devices 102(*a*), 102(*b*) and/or other devices and perform speech-processing operations. For example, the ASR component 140 may be configured to generate text data corresponding to the audio data, and the NLU component 142 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "call the front desk," the NLU component 142 may identify a "call" intent. In this example where the intent data indicates an intent to establish a communication session with "front desk," the speech processing system 130 may call one or more skills and/or applications to effectuate the intent. Skills, as described herein may otherwise be described as applications and may include functionality for utilizing intent data to generate directives and/or instructions.

The components of the environment 100 are described below by way of example. To illustrate, in examples, it may be advantageous to pair the accessory device 103 to the voice interface device 102 without requiring a user of the accessory device 103 to manually pair the devices. At step 1 of FIG. 1, a trigger event may be determined for associating a given voice interface device 102 with a given accessory device 103. Utilizing a hotel enterprise as a nonlimiting example, a user may have reserved a room at a hotel. During a check in process, the user may check in for the reserved room (which may be considered the trigger event), receive keys and/or key codes to enter the room, and may otherwise be engaged in acquiring entry to the hotel room. In some examples, the user may have the accessory device 103 that is associated with the enterprise system 144 (in this example a hotel enterprise), with voice interface devices 102 located in the hotel rooms, and/or with other systems that are associated with the enterprise system 144 of the hotel. In a nonlimiting example, a front-desk clerk or other employee of the enterprise system 144 may assist the user with the check in process and as part of that process may scan or otherwise acquire a device identifier for the accessory device 103 at issue. The device identifier may be associated with the environment (here the hotel room) that the user is associated with. It should be understood that other ways of acquiring the device identifier of the accessory device 103 may also, or alternatively, be used. It should be understood that while a check in event is described herein as an example trigger event, this disclosure includes any trigger event that indicates the accessory device 103 may be associated with the voice interface device 102. Examples may include, when the accessory device 103 is purchased, when the hotel room is reserved, when a user acquires keys to a rental car, when a user enters a work environment, and/or any other trigger event.

Once the device identifier is associated with the environment at issue, an enterprise device 105 utilized by the enterprise system employee may send data representing a check in event (or otherwise a trigger event) to the enterprise system 144, which in examples may be remote from the device that the employee is utilizing. The enterprise system 144 may receive the check in event and may send the check in event to the system 104. The pairing component 134 of the system 104 may receive the check in event and may initiate processes for determining which voice interface device(s) 102 are to be associated with the user and/or user account data associated with the user while the user is staying at the hotel and authorizing the accessory device 103 to be paired with those voice interface device(s) 102. For example, the pairing component 134 may send a discovery request for the device identifiers of the voice interface device(s) 102 to the discovery application 136. The discovery application 136, which may also be referred to herein as a discovery skill, may be an application that was developed in association with the enterprise system 144 for at least pairing purposes and generally for other purposes as well, such as determining responses to voice commands received at the voice interface device(s) 102 associated with the enterprise system 14. The discovery application 136 may receive the discovery request, which may include the device identifier of the accessory device 103. The discovery application 136 may utilize the discovery request to generate a query for association data from the enterprise system 144. The query for association data may include a request for the device identifiers of the voice interface device(s) 102 that the user is authorized to be associated with during the user's stay at the environment in question. In examples, these authorized voice interface device(s) 102 may be the voice interface device(s) 102 that are situated within the hotel room that the user reserved, conference rooms that the user has booked, and/or voice interface device(s) 102 located in environments that the user has an association with.

The enterprise system 144 may return the requested association data to the discovery application 136. The association data may indicate the device identifiers of the authorized voice interface device(s) 102 as well as, in examples, details associated with the authorization. These details may indicate restrictions and/or limits on how the accessory device 103 is authorized to be associated with the voice interface device(s) 102, such as time limits for the authorization, conditions that are to be detected before pairing can occur, etc. The discovery application 136 may generate a discovery response to the discovery request that includes the device identifiers of the voice interface device(s) 102 and the details associated with authorization of the voice interface device(s) 102, when known. The pairing component 134 may receive the discovery response and may generate an association between the device identifier of the accessory device 103 with the device identifiers of the voice interface device(s) 102 in the device association database 138 maintained by the system 104. The device association database 138 may indicate authorized associations between accessory devices 103 and voice interface devices 102 for at least pairing purposes as described herein. At this point, at step 2 of FIG. 1, automated temporary device pairing may be authorized for the specific accessory device 103 at issue and the specific voice interface device(s) 102 at issue, and this authorization for automated temporary device pairing may be performed prior to the user entering the environment with the voice interface device(s) 102 or otherwise before a user would typically interact with the voice interface device(s) 102.

At some point thereafter, the user may move to the environment with the voice interface device(s) 102. In the hotel example, the user may move from a front desk area of the hotel to the room that the user reserved for the user's stay at the hotel. In a rental car example, the user may move from a front desk area and/or check in area for renting a vehicle to where the vehicle is parked. As the user moves, the accessory device 103 may be configured to emit a beacon or otherwise a signal that identifies the accessory device 103 and may be received by voice interface device(s) 102. In examples the beacon may be sent utilizing a short range communication protocol such as Bluetooth®, BLE, etc. When the accessory device 103 moves to within a threshold distance of a given voice interface device 102, the voice interface device 102 may receive the beacon. Several examples of threshold distances are provided herein, but generally the threshold distance may be a distance associated with the environment in which the voice interface device 102 is situated, such as when a user enters the hotel room, when a user enters a rented car, when a user enters a given conference room, when a user enters a certain area of a working environment, etc. As such, in examples, the threshold distance may be dynamic and may depend at least in part on the enterprise system 144 at issue and/or the type of enterprise associated with the enterprise system 144. The threshold distance may be set by the enterprise system 144 and/or by the system 104.

When the voice interface device 102 receives the beacon from the accessory device 103, the voice interface device 102 may generate and send a beacon event to the pairing component 134 of the system 104. The beacon event may include the device identifier of the accessory device 103 as well as the device identifier of the voice interface device 102 that received the beacon. The pairing component 134 may determine whether the accessory device 103 is authorized to pair with the voice interface device 102 based at least in part on whether an association between the accessory device 103 and the voice interface device 102 is present in the device association database 138. When authorized, the pairing component 134 may generate and send a pairing command to the accessory device 103 (which may be sent directly to the accessory device 103 and/or to the accessory device 103 via one or more other devices, such as the voice interface device 102 and/or internet-based access points, for example). The pairing command may cause the pairing component 128 of the accessory device 103 to transition the accessory device to a pairing mode where the accessory device 103 is caused to transmit a pairing request that is configured to be received by devices within a given range of the accessory device 103. Additionally, the pairing component 134 of the system 104 may send a pairing command to the voice interface device 102. The pairing command sent to the voice interface device 102 may cause the pairing component 120 of the voice interface device 102 to transition the voice interface device 102 into the pairing mode as well, but the pairing mode of the voice interface device 102 may be associated with receiving pairing requests (as opposed to transmitting pairing requests) from devices that are within a given range of the voice interface device 102. The pairing command sent to the voice interface device 102 may also indicate the device identifier of the accessory device 103 that is authorized for automated temporary device pairing.

With both the accessory device 103 and the voice interface device 102 in a pairing mode, at step 3 of FIG. 1, the voice interface device 102 may receive the pairing request from the accessory device 103, determine that the device identifier of the accessory device 103 as received in the pairing request corresponds to the device identifier authorized by the pairing component 134 of the system 104, and may perform processes to establish a paired connection as between the accessory device 103 and the voice interface device 102. When the connection is established as between the accessory device 103 and the voice interface device 102, the voice interface device 102 may maintain the device identifier of the accessory device 103 in a list of paired devices. Once paired, at step 4 of FIG. 1, the voice interface device 102 may send a pairing acknowledgement indicating that the pairing was performed successfully to the system 104, which may communicate the pairing to the enterprise system 144 along with data to enable the enterprise system 144 to communicate with the accessory device 103 while the accessory device 103 is paired to the voice interface device 102. By so doing, the enterprise system 144 may communicate with the accessory device 103 directly and/or via the voice interface device 102.

At some point after device pairing occurs, a dissociation event may be detected indicating that the accessory device 103 is to be dissociated from the voice interface device 102 or otherwise the paired connection as between the accessory device 103 and the voice interface device 102 is to be undone. Using the hotel example, the user may check out of the user's room and the enterprise system 144 may send a check out event to the pairing component 134 of the system 104. The pairing component 134 may receive the checkout event and may cause the device association database 138 to remove the association between the accessory device 103 and the voice interface device 102. Additionally, the pairing component 134 may send a command to the voice interface device 102 that causes the voice interface device 102 to remove the device identifier of the accessory device 103 from the list of paired devices as maintained by the voice interface device 102. This may cause the voice interface device 102 to no longer acknowledge the accessory device 103 as a paired and authorized device. Additionally, the pairing component 134 may send a command to the accessory device 103 that may cause the accessory device 103 to reset itself to a state that the accessory device 103 was in prior to pairing with the voice interface device 102. In examples, this state may be a factory reset state. By so doing, the accessory device 103 may revert to a state where it may be configured to pair with other devices, the voice interface device 102 may no longer be configured to communicate with the accessory device 103, and the system 104 may accurately maintain data for determining what device pairings are authorized. In some examples, the command sent to the accessory device 103 may be sent at a different time from when the command is sent to the voice interface device 102, such as in scenarios where the command sent to the accessory device 103 is sent when the accessory device 103 is associated with a different network of devices (such as a home network of devices or a network of devices related to another enterprise). In total, the automated temporary device pairings described herein allow for a user to, in examples, move an accessory device 103 to within a threshold distance of an authorized voice interface device 102 and the accessory device 103 may be paired to the voice interface device 102 without requiring user input data from the user. Also, the accessory device 103 may be dissociated from the voice interface device 102 when the user is dissociated from the environment and again without user input data from the user.

It should be understood that while multiple examples include the automated temporary device connection as between a given accessory device 103 and a given voice interface device 102, this disclosure includes the ability to pair multiple accessory devices with a given voice interface device 102 and/or the ability to pair an accessory device 103 with multiple voice interface devices. Additionally, as noted above, while examples described herein include hotel-based examples, any enterprise system 144 where automated temporary device connections may be desirable may be utilized. By way of nonlimiting example, a rental car enterprise system may be associated with the systems and methods described herein to authorize device pairings when a user rents a given car, and then pairings between the rented vehicle and a user device such as a phone may be automatically performed when the user brings the phone to within a threshold distance of the rented vehicle. Upon conclusion of the rental car term and/or when the user returns the rental car, dissociation of the phone from the rental vehicle may be performed.

It should be noted that while text data is described as a type of data utilized to communicate between various components of the system 104 and/or other systems and/or devices, the components of the system 104 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices.

As shown in FIG. 1, several of the components of the system 104 and the associated functionality of those components as described herein may be performed by one or more of the devices. Additionally, or alternatively, some or all of the components and/or functionalities associated with the devices may be performed by the system 104.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 108, 122, and/or the processor(s) described with respect to the components of the system 104, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108, 122, and/or the processor(s) described with respect to the components of the system 104 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or the processor(s) described with respect to the components of the system 104 may possess its own local memory, which also may store program components, program data, and/or one or more operating systems.

The memory 112, 126 and/or the memory described with respect to the components of the system 104 may include volatile and nonvolatile memory, removable and non-removable media implemented in any method or technology for storage of information, such as computer-readable instructions, data structures, program component, or other data. Such memory 112, 126 and/or the memory described with respect to the components of the system 104 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 112, 126, and/or the memory described with respect to the components of the system 104 may be implemented as computer-readable storage media ("CRSM"), which may be any available physical media accessible by the processor(s) 108, 122, and/or the processor(s) described with respect to the system 104 to execute instructions stored on the memory 112, 126, and/or the memory described with respect to the components of the system 104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 112, 126, and/or the memory described with respect to the components of the system 104, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project: other UNIX or UNIX-like variants: a variation of the Linux operating system as promulgated by Linus Torvalds: the FireOS operating system from Amazon.com Inc. of Seattle, Washington, USA: the Windows operating system from Microsoft Corporation of Redmond, Washington, USA: LynxOS as promulgated by Lynx Software Technologies, Inc. of San Jose, California: Operating System Embedded (Enea OSE) as promulgated by ENEA AB of Sweden; and so forth.

The network interface(s) 110, 124, and/or the network interface(s) described with respect to the components of the system 104 may enable messages between the components and/or devices shown in environment 100 and/or with one or more other polling systems, as well as other networked devices. Such network interface(s) 110, 124, and/or the network interface(s) described with respect to the components of the system 104 may include one or more network interface controllers (NICs) or other types of transceiver devices to send and receive messages over the network 106.

For instance, each of the network interface(s) 110, 124, and/or the network interface(s) described with respect to the components of the system 104 may include a personal area network (PAN) component to enable messages over one or more short-range wireless message channels. For instance, the PAN component may enable messages compliant with at least one of the following standards IEEE 802. 15.4 (ZigBee), IEEE 802.15.1 (Bluetooth), IEEE 802.11 (WiFi), or any other PAN message protocol. Furthermore, each of the network interface(s) 110, 124, and/or the network interface(s) described with respect to the components of the system 104 may include a wide area network (WAN) component to enable message over a wide area network.

In some instances, the system 104 may be local to an environment associated the devices. For instance, the system 104 may be located within one or more of the voice interface devices 102 and/or the accessory devices 103. In some instances, some or all of the functionality of the system 104 may be performed by one or more of the devices. Also, while various components of the system 104 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device and/or edge server in a home and/or office environment, a self-driving automobile, a bus, an airplane, a camper, a trailer, and/or other similar object having a computer to perform its own sensor processing, etc.

Figure 2:
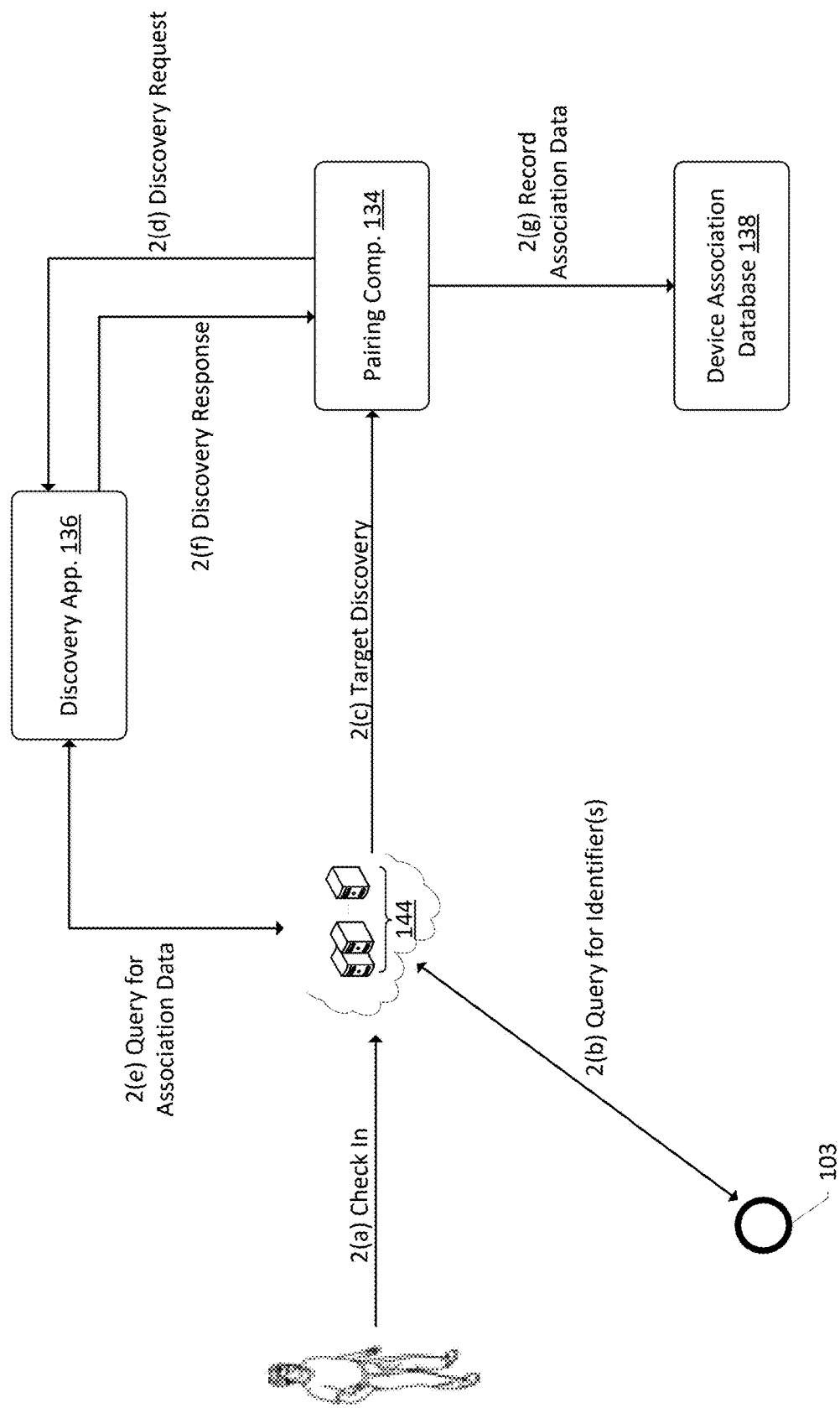
FIG. 2 illustrates a conceptual diagram of example components and devices that may be utilized to generate an association between one or more accessory devices and one or more voice interface devices for automated pairing purposes.

FIG. 2 illustrates a conceptual diagram of example components and devices that may be utilized to generate an association between one or more accessory devices and one or more voice interface devices for automated pairing purposes. FIG. 2 may include at least some of the same components and devices described with respect to FIG. 1. For example, FIG. 2 may include an accessory device 103, an enterprise system 144, a pairing component 134 of a system associated with one or more voice interface devices, a discovery application 136, and/or a device association database 138. FIG. 2 illustrates the flow of data between devices and components utilizing steps 2(a)-2(g). However, it should be understood that these steps may be performed in an order different from that shown in FIG. 2 and/or may be performed at least partially in parallel. Additionally, more or less steps may be performed to achieve the result indicated in FIG. 2.

At step 2(a), a trigger event may be determined for associating a given voice interface device with the accessory device 103. Utilizing a hotel enterprise as a nonlimiting example, a user may have reserved a room at a hotel. During a check in process, the user may check in for the reserved room (which may be considered the trigger event), receive keys and/or key codes to enter the room, and may otherwise be engaged in acquiring entry to the hotel room. In some examples, the user may have the accessory device 103 that is associated with the enterprise system 144 (in this example a hotel enterprise), with voice interface devices located in the hotel rooms, and/or with other systems that are associated with the enterprise system 144 of the hotel.

At step 2(b), in a nonlimiting example, a front-desk clerk or other employee of the enterprise system 144 may assist the user with the check in process and as part of that process may scan or otherwise acquire a device identifier for the accessory device 103 at issue. The device identifier may be associated with the environment (here the hotel room) that the user is associated with. It should be understood that other ways of acquiring the device identifier of the accessory device 103 may also, or alternatively, be used. It should be understood that while a check in event is described herein as an example trigger event, this disclosure includes any trigger event that indicates the accessory device 103 may be associated with the voice interface device. Examples may include, when the accessory device 103 is purchased, when the hotel room is reserved, when a user acquires keys to a rental car, when a user enters a work environment, and/or any other trigger event.

At step 2(c), once the device identifier is associated with the environment at issue, a device utilized by the enterprise system employee may send data representing a target discovery request (or otherwise a trigger event) to the enterprise system 144, which in examples may be remote from the device that the employee is utilizing. The enterprise system 144 may receive the target discovery request and may send the target discovery request to the system 104.

At step 2(d), the pairing component 134 may initiate processes for determining which voice interface device(s) are to be associated with the user and/or user account data associated with the user while the user is staying at the hotel and authorizing the accessory device 103 to be paired with those voice interface device(s). For example, the pairing component 134 may send a discovery request for the device identifiers of the voice interface device(s) to the discovery application 136. The discovery application 136, which may also be referred to herein as a discovery skill, may be an application that was developed in association with the enterprise system 144 for at least pairing purposes and generally for other purposes as well, such as determining responses to voice commands received at the voice interface device(s) associated with the enterprise system 143. The discovery application 136 may receive the discovery request, which may include the device identifier of the accessory device 103.

At step 2(e), the discovery application 136 may utilize the discovery request to generate and send a query for association data to the enterprise system 144. The query for association data may include a request for the device identifiers of the voice interface device(s) that the user is authorized to be associated with during the user's stay at the environment in question. In examples, these authorized voice interface device(s) may be the voice interface device(s) that are situated within the hotel room that the user reserved, conference rooms that the user has booked, and/or voice interface device(s) located in environments that the user has an association with. The enterprise system 144 may return the requested association data to the discovery application 136. The association data may indicate the device identifiers of the authorized voice interface device(s) as well as, in examples, details associated with the authorization. These details may indicate restrictions and/or limits on how the accessory device 103 is authorized to be associated with the voice interface device(s), such as time limits for the authorization, conditions that are to be detected before pairing can occur, etc.

At step 2(f), the discovery application 136 may generate a discovery response to the discovery request that includes the device identifiers of the voice interface device(s) and the details associated with authorization of the voice interface device(s), when known.

At step 2(g), the pairing component 134 may receive the discovery response and may generate an association between the device identifier of the accessory device 103 with the device identifiers of the voice interface device(s) in the device association database 138 maintained by the system 104. The device association database 138 may indicate authorized associations between accessory devices 103 and voice interface devices for at least pairing purposes as described herein. At this point, automated temporary device pairing may be authorized for the specific accessory device 103 at issue and the specific voice interface device(s) at issue, and this authorization for automated temporary device pairing may be performed prior to the user entering the environment with the voice interface device(s) or otherwise before a user would typically interact with the voice interface device(s).

Figure 3:
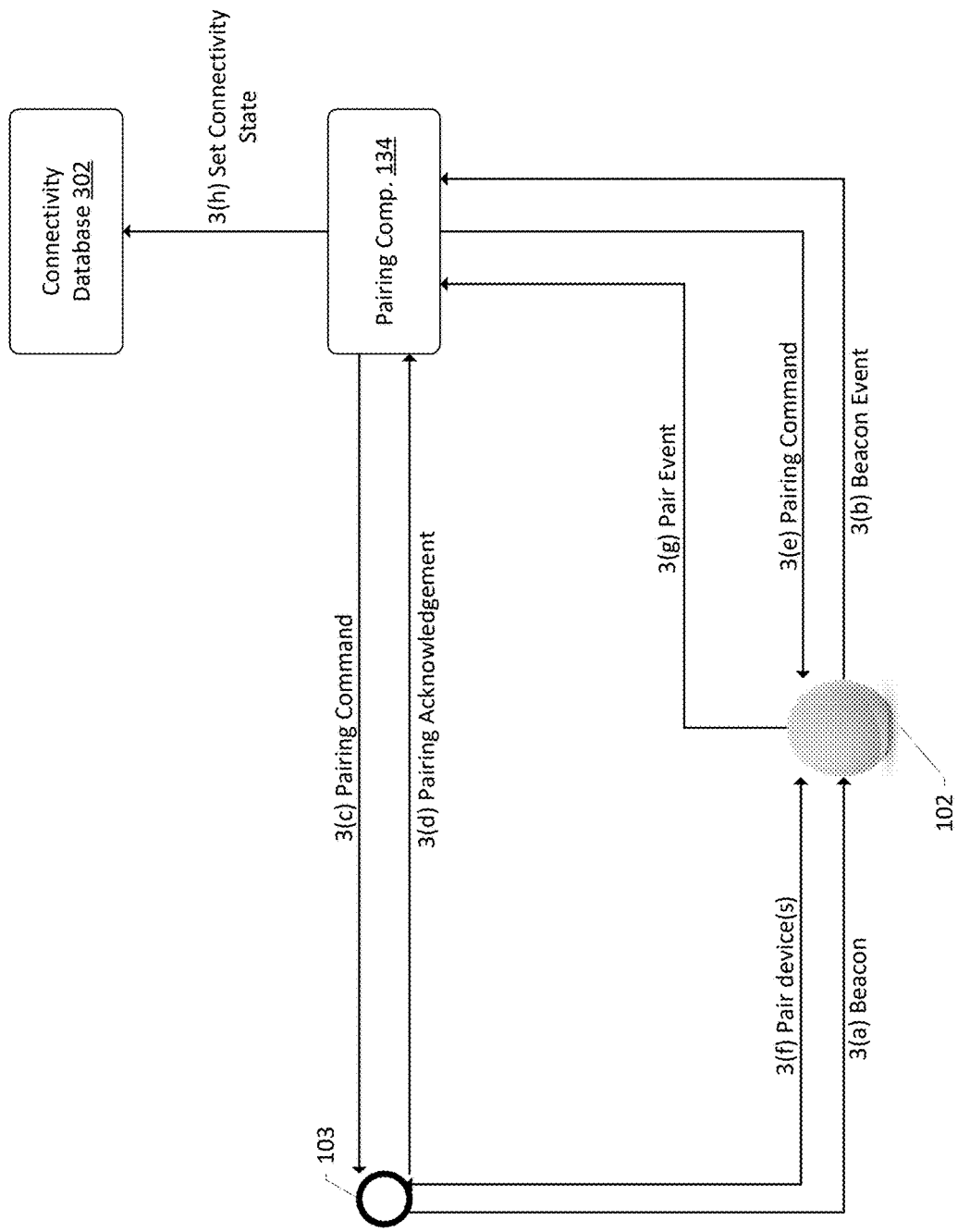
FIG. 3 illustrates a conceptual diagram of example components and devices that may be utilized to performing automated pairing operations.

FIG. 3 illustrates a conceptual diagram of example components and devices that may be utilized to performing automated pairing operations. FIG. 3 may include at least some of the same components and devices described with respect to FIG. 1. For example, FIG. 3 may include a voice interface device 102, an accessory device 103, an enterprise system 144, and/or a pairing component 134 of a system associated with one or more voice interface devices. FIG. 3 illustrates the flow of data between devices and components utilizing steps 3(a)-3(h). However, it should be understood that these steps may be performed in an order different from that shown in FIG. 3 and/or may be performed at least partially in parallel. Additionally, more or less steps may be performed to achieve the result indicated in FIG. 3.

At step 3(a), at some point after the accessory device 103 is associated with the voice interface device 102 in a device association database of the system 104, the user may move to the environment with the voice interface device 102. In the hotel example, the user may move from a front desk area of the hotel to the room that the user reserved for the user's stay at the hotel. In a rental car example, the user may move from a front desk area and/or check in area for renting a vehicle to where the vehicle is parked. As the user moves, the accessory device 103 may be configured to emit a beacon or otherwise a signal that identifies the accessory device 103 and may be received by voice interface device 102. In examples the beacon may be sent utilizing a short range communication protocol such as Bluetooth®, BLE, etc. When the accessory device 103 moves to within a threshold distance of a given voice interface device 102, the voice interface device 102 may receive the beacon. Several examples of threshold distances are provided herein, but generally the threshold distance may be a distance associated with the environment in which the voice interface device 102 is situated, such as when a user enters the hotel room, when a user enters a rented car, when a user enters a given conference room, when a user enters a certain area of a working environment, etc. As such, in examples, the threshold distance may be dynamic and may depend at least in part on the enterprise system 144 at issue and/or the type of enterprise associated with the enterprise system 144. The threshold distance may be set by the enterprise system 144 and/or by the system 104.

At step 3(b), when the voice interface device 102 receives the beacon from the accessory device 103, the voice interface device 102 may generate and send a beacon event to the pairing component 134 of the system 104. The beacon event may include the device identifier of the accessory device 103 as well as the device identifier of the voice interface device 102 that received the beacon.

At step 3(c), the pairing component 134 may determine whether the accessory device 103 is authorized to pair with the voice interface device 102 based at least in part on whether an association between the accessory device 103 and the voice interface device 102 is present in the device association database 138. When authorized, the pairing component 134 may generate and send a pairing command to the accessory device 103 (which may be sent directly to the accessory device 103 and/or to the accessory device 103 via one or more other devices, such as the voice interface device 102 and/or internet-based access points, for example). The pairing command may cause the pairing component 128 of the accessory device 103 to transition the accessory device to a pairing mode where the accessory device 103 is caused to transmit a pairing request that is configured to be received by devices within a given range of the accessory device 103. The pairing command may represent encrypted data that is encrypted utilizing pre-provisioned cryptographic material known to the system 104.

At step 3(d), the accessory device 103 may send a pairing acknowledgement to the pairing component 134. The pairing acknowledgement may indicate that the accessory device 103 was successfully put into pairing mode and is transmitting the pairing request.

At step 3(e), the pairing component 134 of the system 104 may send a pairing command to the voice interface device 102. The pairing command sent to the voice interface device 102 may cause the pairing component 120 of the voice interface device 102 to transition the voice interface device 102 into the pairing mode as well, but the pairing mode of the voice interface device 102 may be associated with receiving pairing requests (as opposed to transmitting pairing requests) from devices that are within a given range of the voice interface device 102. The pairing command sent to the voice interface device 102 may also indicate the device identifier of the accessory device 103 that is authorized for automated temporary device pairing. The pairing command may represent encrypted data that is encrypted utilizing pre-provisioned cryptographic material known to the system 104.

At step 3(f), with both the accessory device 103 and the voice interface device 102 in a pairing mode, the voice interface device 102 may receive the pairing request from the accessory device 103, determine that the device identifier of the accessory device 103 as received in the pairing request corresponds to the device identifier authorized by the pairing component 134 of the system 104, and may perform processes to establish a paired connection as between the accessory device 103 and the voice interface device 102. When the connection is established as between the accessory device 103 and the voice interface device 102, the voice interface device 102 may maintain the device identifier of the accessory device 103 in a list of paired devices.

At step 3(g), once paired, the voice interface device 102 may send a pairing event indicating that the pairing was performed successfully to the system 104, which may communicate the pairing to the enterprise system 144. This pairing event may indicate that communications between the accessory device 103 and the voice interface device 102, and/or the accessory device with one or more devices and systems (including the system 104 and/or the enterprise system 144) are authorized.

At step 3(h), the pairing component 134 may set a connectivity state in a connectivity database 302. The connectivity state may indicate that the pairing was performed successfully to the system 104. This pairing event may indicate that communications between the accessory device 103 and the voice interface device 102, and/or the accessory device with one or more devices and systems (including the system 104 and/or the enterprise system 144) are authorized.

Figure 4:
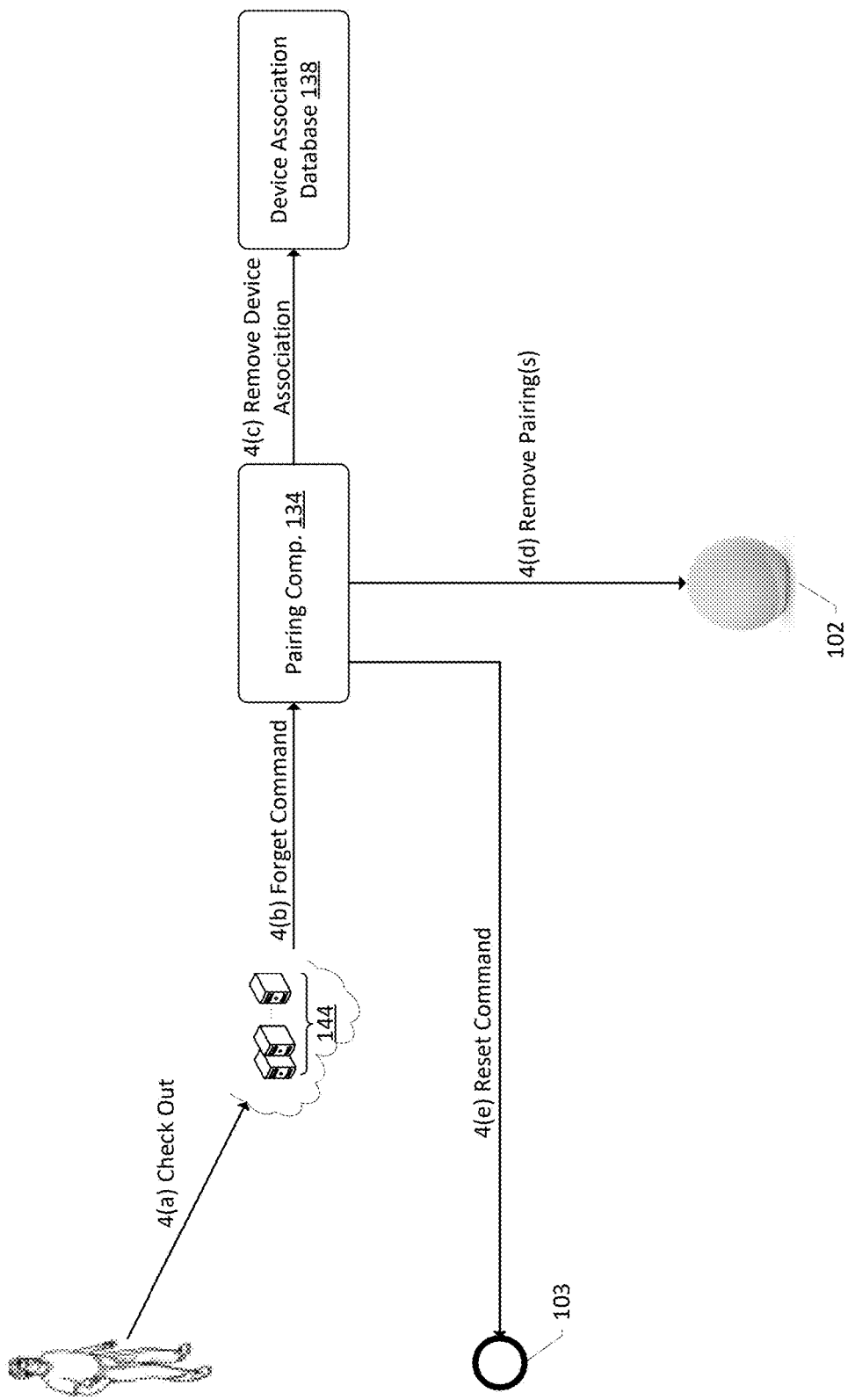
FIG. 4 illustrates a conceptual diagram of example components and devices that may be utilized to automatically unpair devices.

FIG. 4 illustrates a conceptual diagram of example components and devices that may be utilized to automatically unpair devices. FIG. 4 may include at least some of the same components and devices described with respect to FIG. 1. For example, FIG. 4 may include a voice interface device 102, an accessory device 103, an enterprise system 144, a pairing component 134 of a system 104 associated with one or more voice interface devices, and/or a device association database 138. FIG. 4 illustrates the flow of data between devices and components utilizing steps 4(a)-4(e). However, it should be understood that these steps may be performed in an order different from that shown in FIG. 4 and/or may be performed at least partially in parallel. Additionally, more or less steps may be performed to achieve the result indicated in FIG. 4.

At step 4(a), a dissociation event may be detected indicating that the accessory device 103 is to be dissociated from the voice interface device 102 or otherwise the paired connection as between the accessory device 103 and the voice interface device 102 is to be undone. Using the hotel example, the user may check out of the user's room.

At step 4(b), the enterprise system 144 may send a forget command to the pairing component 134 of the system 104. The pairing component 134 may receive the forget command and determine that one or more processes are to be performed to dissociate the accessory device 103 from the voice interface device 102.

At step 4(c), one of those dissociation processes may include causing the device association database 138 to remove the association between the accessory device 103 and the voice interface device 102. By so doing, the device association database 138 may be updated such that the association between the accessory device 103 and the voice interface device 102 indicating authorization for automated temporary device connection is removed from the device association database 138. In examples, at least some data about the prior association of accessory devices to voice interface devices may be maintained in the device association database 138, such as to show historical associations, and/or such data may be associated with user account data of the user in question.

At step 4(d), one of the dissociation processes may include the pairing component 134 sending a command to the voice interface device 102 that causes the voice interface device 102 to remove the device identifier of the accessory device 103 from the list of paired devices as maintained by the voice interface device 102. This may cause the voice interface device 102 to no longer acknowledge the accessory device 103 as a paired and authorized device. By so doing, even when the accessory device 103 attempts to utilize the previously-valid connection between the accessory device 103 and the voice interface device 102 to communicate with the voice interface device 102, that connection may not be approved by the voice interface device 102 and the accessory device 103 may not be presented as an available device for sharing data with the voice interface device 102.

At step 4(e), one of the dissociation processes may include the pairing component 134 sending a command to the accessory device 103 that may cause the accessory device 103 to reset itself to a state that the accessory device 103 was in prior to pairing with the voice interface device 102. In examples, this state may be a factory reset state. By so doing, the accessory device 103 may revert to a state where it may be configured to pair with other devices, the voice interface device 102 may no longer be configured to communicate with the accessory device 103, and the system 104 may accurately maintain data for determining what device pairings are authorized. In some examples, the command sent to the accessory device 103 may be sent at a different time from when the command is sent to the voice interface device 102, such as in scenarios where the command sent to the accessory device 103 is sent when the accessory device 103 is associated with a different network of devices (such as a home network of devices or a network of devices related to another enterprise). In total, the automated temporary device pairings described herein allow for a user to, in examples, move an accessory device 103 to within a threshold distance of an authorized voice interface device 102 and the accessory device 103 may be paired to the voice interface device 102 without requiring user input data from the user. Also, the accessory device 103 may be dissociated from the voice interface device 102 when the user is dissociated from the environment and again without user input data from the user.

Figure 5:
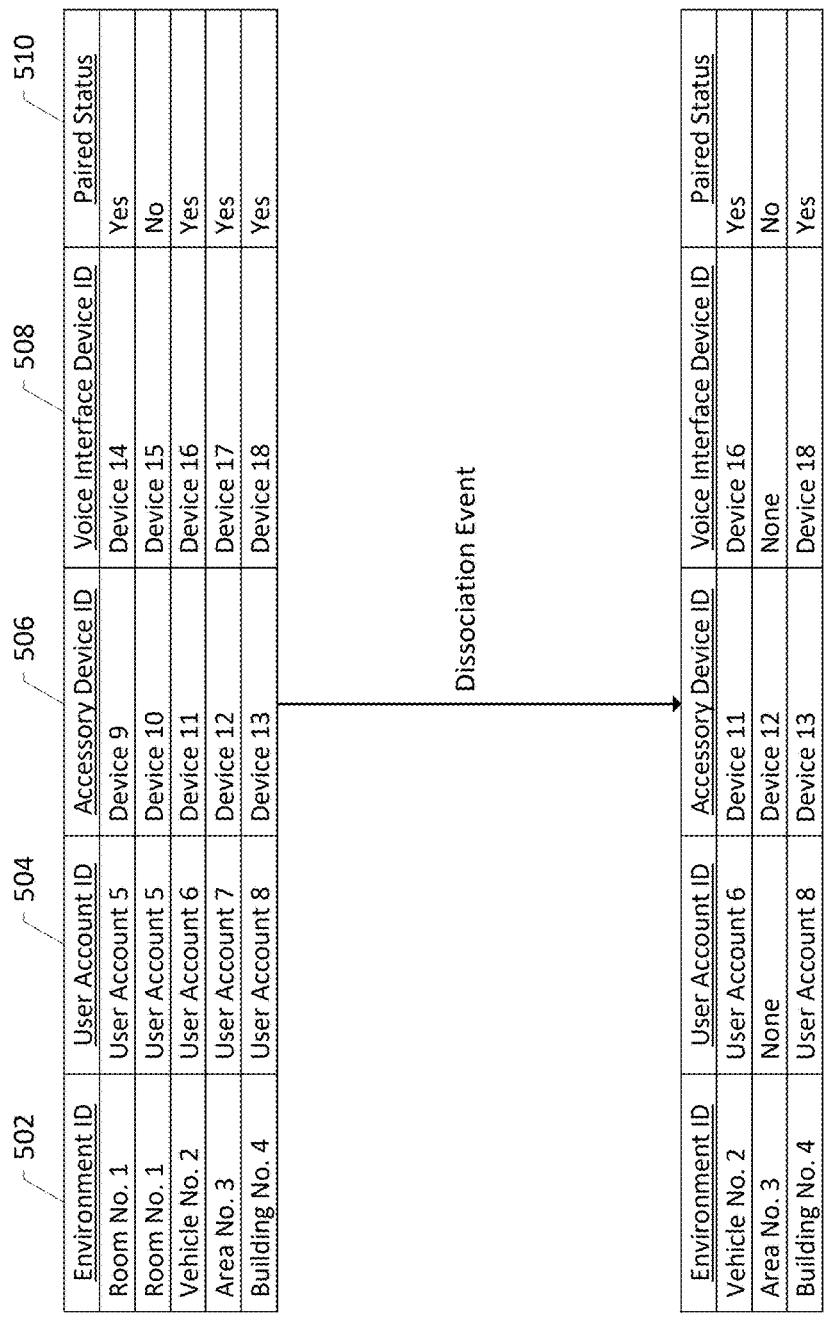
FIG. 5 illustrates a conceptual diagram of example data that may be utilized for automated temporary device connectivity.

FIG. 5 illustrates a conceptual diagram of example data that may be utilized for automated temporary device connectivity. The example data illustrated in FIG. 5 may be stored in a device association database, such as a device association database 138 of the system 104. FIG. 5 illustrates how device association data may change over time, indicated by differences between the tables from top to bottom in FIG. 5.

The device association data may include, for example, an environment identifier 502, a user account identifier 504, an accessory device identifier 506, a voice interface device identifier 508, and/or a paired status indicator 510. It should be understood that other data types may be stored in association with the device association database and that the data types discussed in FIG. 5 are provided by way of nonlimiting example. The environment identifiers 502 may indicate an environment in which a given device is situated. The environment may be determined by user input data, by the system 104, by enterprise systems associated with the accessory devices, and/or by one or more other devices. The user account identifiers 504 may indicate given user accounts associated with the accessory devices and/or the voice interface devices. The accessory device identifiers 506 may indicate the serial numbers of the accessory devices at issue and/or identifiers generated and associated with the accessory devices by the system 104 and/or by the enterprise systems associated with the accessory devices. The voice interface device identifiers 508 may indicate the serial numbers or other identifiers of the voice interface devices associated with the device association database. These voice interface device identifiers 508 may be generated and provided by the system 104. The paired status indicator 510 may indicate whether the accessory device at issue and the voice interface device at issue have been successfully paired and are, at a given time, still paired.

Utilizing FIG. 5 as an example, the device association database may indicate that a given environment identifier 502 (e.g., Room No. 1 from FIG. 5) is associated with two voice interface device identifiers 508 (e.g., Device 14 and Device 15). In this example, Room No. 1, say a hotel room associated with a given hotel, has two voice interface devices associated with it. Staying with the above example, at some point the enterprise system in question may receive a trigger event, such as a user checking in to the hotel, and may send data indicating the check in event to the system. In this example, a user has checked in to Room No. 1 and the enterprise system may send data indicating this check in event. In addition to checking in to the room, the user may have acquired or otherwise been associated with one or more accessory devices. In the example of FIG. 5, the user (associated with User Account 5) may first be associated with Accessory Device 9. The enterprise system at issue may send data indicating that Accessory Device 9 has been associated with the user and Room No. 1. This data may be utilized by the system 104 to generate a discovery request for the enterprise system, and the enterprise system may return a discovery response that indicates the authorized voice interface device identifiers 508 for Room No. 1 are Device 14 and Device 15. This discovery response may be utilized by the system 104 to generate and store the device association data shown in FIG. 5.

As described in more detail with respect to FIG. 1, at some point Accessory Device 9 may move to within a threshold range (which may be described in examples as a threshold proximity) of Device 14 and doing so may trigger the system 104 to send commands to the respective devices to enter a pairing mode and to pair or otherwise connect to each other. When pairing successfully occurs, Device 14 may send a pairing confirmation to the system 104, and the pairing status indicator 510 may be updated to indicate pairing has occurred. As shown in FIG. 5, at the same or a different time, more than one accessory device may be associated with the same environment identifier 502, and this information may be utilized to pair multiple accessory devices to the same voice interface device in a given environment and/or to multiple voice interface devices within the environment. Also as shown in FIG. 5, the environment may be any environment and may not necessarily be a room. Some nonlimiting examples may include a given vehicle, a given area (which may not necessarily be associated with a physical structure), a given building, etc.

At some point after pairing between accessory devices and voice interface devices, a dissociation event may occur. Some nonlimiting examples of dissociation events may include a user checking out of a hotel, a user returning a rental car, a predetermined period of time lapsing, a user's employment status changing, etc. As shown in FIG. 5, one such dissociation event may be that User Account 5 is dissociated from Room No. 1. When this occurs, the device association database may be updated to show that User Account 5 is no longer associated with Room No. 1, the accessory devices associated with User Account 5 are also no longer associated with Room No. 1, and any device pairings between the accessory devices and the voice interface devices in question have been unpaired or otherwise not paired. In other examples, the device association database may be updated to remove the data associated with Room No. 1, which may also indicate that associations between accessory devices and voice interface devices related to Room No. 1 are no longer authorized. By way of a different example, a dissociation event such as a voice interface device being dissociated from a given environment (here Area No. 3) may cause the device association database to be updated to show that the particular voice interface device identifier 508 is no longer associated with the environment identifier 502 and the user account identifier 504 for that voice interface device is also no longer associated with the environment identifier 502. By so doing, associations between environments, user accounts, accessory devices, and voice interface devices may be maintained and modified over time, and data representing these associations and dissociations may be stored by the device association database and utilized for authorizing automated temporary device connections as described herein.

Figure 6:
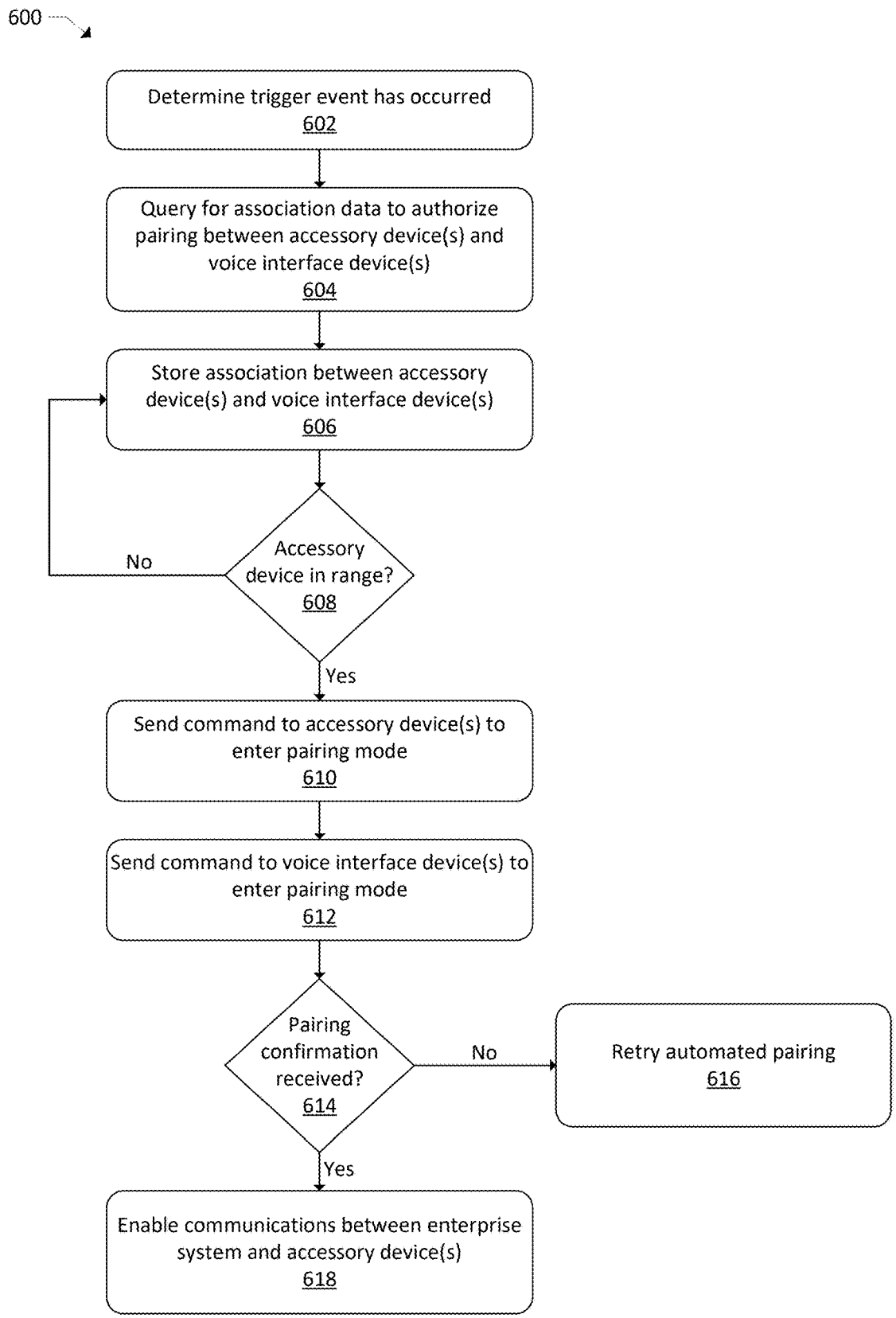
FIG. 6 illustrates a flow diagram of an example process for automated pairing of devices and enabling communications between accessory devices and enterprise systems while such devices are paired.
Figure 7:
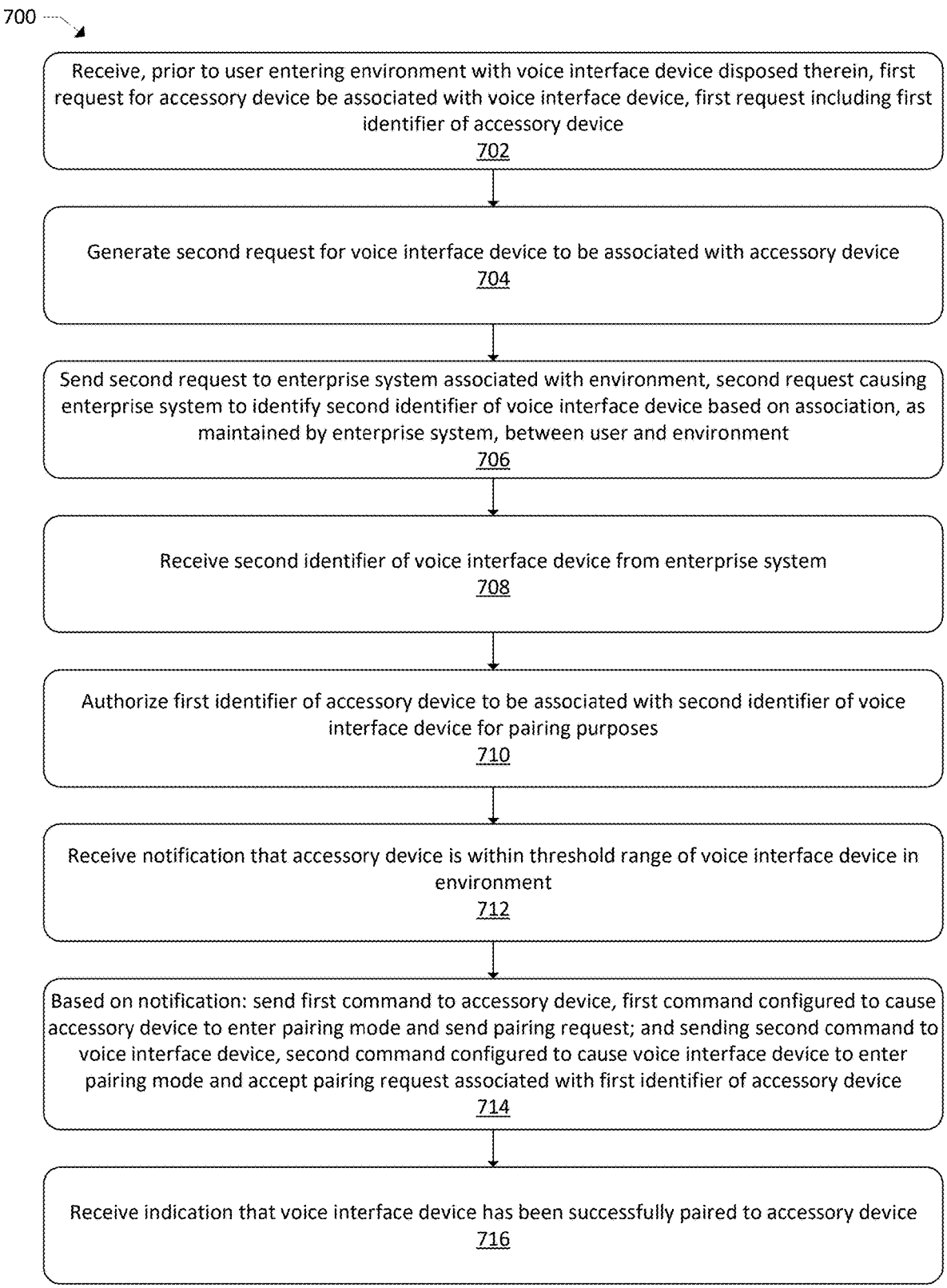
FIG. 7 illustrates a flow diagram of an example process for automated temporary device connectivity.
Figure 8:
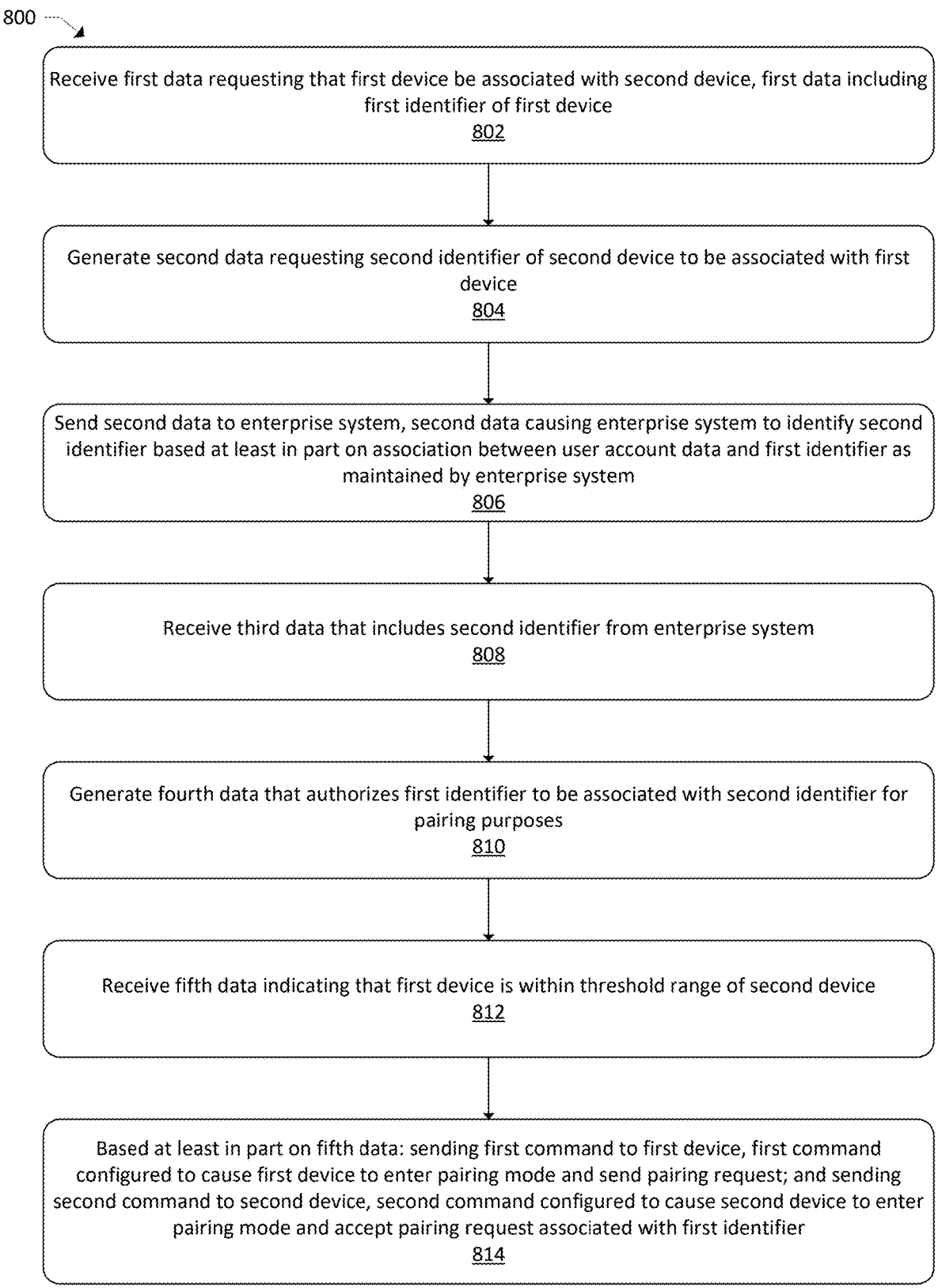
FIG. 8 illustrates a flow diagram of another example process for automated temporary device connectivity.

FIGS. 6-8 illustrates processes for automated temporary device connectivity. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-5, 9, and 10, although the processes may be implemented in a wide variety of other environments, architectures and systems.

FIG. 6 illustrates a flow diagram of an example process 600 for automated pairing of devices and enabling communications between accessory devices and enterprise systems while such devices are paired. The order in which the operations or steps are described is not intended to be construed as a limitation, and any number of the described operations may be combined in any order and/or in parallel to implement process 600.

At block 602, the process 600 may include determining a trigger event has occurred associated with device pairing. Utilizing a hotel enterprise as a nonlimiting example, a user may have reserved a room at a hotel. During a check in process, the user may check in for the reserved room (which may be considered the trigger event), receive keys and/or key codes to enter the room, and may otherwise be engaged in acquiring entry to the hotel room. In some examples, the user may have an accessory device that is associated with an enterprise system (in this example a hotel enterprise), with voice interface devices located in the hotel rooms, and/or with other systems that are associated with the enterprise system of the hotel. In a nonlimiting example, a front-desk clerk or other employee of the enterprise system may assist the user with the check in process and as part of that process may scan or otherwise acquire a device identifier for the accessory device at issue. The device identifier may be associated with the environment (here the hotel room) that the user is associated with. It should be understood that other ways of acquiring the device identifier of the accessory device may also, or alternatively, be used. It should be understood that while a check in event is described herein as an example trigger event, this disclosure includes any trigger event that indicates the accessory device may be associated with the voice interface device. Examples may include, when the accessory device is purchased, when the hotel room is reserved, when a user acquires keys to a rental car, when a user enters a work environment, and/or any other trigger event.

At block 604, the process 600 may include querying for association data to authorize pairing between one or more accessory devices and one or more voice interface devices. For example, a pairing component of the system at issue may send a discovery request for the device identifiers of the voice interface device(s) to a discovery application associated with the enterprise system. The discovery application, which may also be referred to herein as a discovery skill, may be an application that was developed in association with the enterprise system for at least pairing purposes and generally for other purposes as well, such as determining responses to voice commands received at the voice interface device(s) associated with the enterprise system. The discovery application may receive the discovery request, which may include the device identifier of the accessory device, and generate a discovery response that indicates identifiers of the authorized voice interface device(s) associated with the accessory devices from the discovery request.

At block 606, the process 600 may include storing an association between the one or more accessory device and the one or more voice interface devices. For example, the pairing component may receive the discovery response and may generate an association between the device identifier of the accessory device with the device identifiers of the voice interface device(s) in a device association database maintained by the system. The device association database may indicate authorized associations between accessory devices and voice interface devices for at least pairing purposes as described herein. At this point, automated temporary device pairing may be authorized for the specific accessory device at issue and the specific voice interface device(s) at issue, and this authorization for automated temporary device pairing may be performed prior to the user entering the environment with the voice interface device(s) or otherwise before a user would typically interact with the voice interface device(s).

At block 608, the process 600 may include determining whether a device proximity event has occurred, or otherwise that the accessory device is within a threshold range of the voice interface device. In the hotel example, the user may move from a front desk area of the hotel to the room that the user reserved for the user's stay at the hotel. In a rental car example, the user may move from a front desk area and/or check in area for renting a vehicle to where the vehicle is parked. As the user moves, the accessory device may be configured to emit a beacon or otherwise a signal that identifies the accessory device and may be received by voice interface device. In examples the beacon may be sent utilizing a short range communication protocol such as Bluetooth®, BLE, etc. When the accessory device moves to within a threshold distance of a given voice interface device, the voice interface device may receive the beacon. Several examples of threshold distances are provided herein, but generally the threshold distance may be a distance associated with the environment in which the voice interface device is situated, such as when a user enters the hotel room, when a user enters a rented car, when a user enters a given conference room, when a user enters a certain area of a working environment, etc. As such, in examples, the threshold distance may be dynamic and may depend at least in part on the enterprise system at issue and/or the type of enterprise associated with the enterprise system. The threshold distance may be set by the enterprise system and/or by the system.

In examples where a device proximity event has not occurred, the process 600 may return to block 606, where the system at issue may wait until a device proximity event is received and/or where the system may request indications of device proximity events from the one or more voice interface devices.

In examples where the device proximity event has occurred, the process 600 may include, at block 610, sending a command to the accessory device(s) to enter a pairing mode. For example, the pairing component may determine whether the accessory device is authorized to pair with the voice interface device based at least in part on whether an association between the accessory device and the voice interface device is present in the device association database. When authorized, the pairing component may generate and send a pairing command to the accessory device (which may be sent directly to the accessory device and/or to the accessory device via one or more other devices, such as the voice interface device and/or internet-based access points, for example). The pairing command may cause the pairing component of the accessory device to transition the accessory device to a pairing mode where the accessory device is caused to transmit a pairing request that is configured to be received by devices within a given range of the accessory device.

At block 612, the process 600 may include sending a command to the voice interface device(s) to enter the pairing mode. For example, the pairing component of the system may send a pairing command to the voice interface device. The pairing command sent to the voice interface device may cause the pairing component of the voice interface device to transition the voice interface device into the pairing mode as well, but the pairing mode of the voice interface device may be associated with receiving pairing requests (as opposed to transmitting pairing requests) from devices that are within a given range of the voice interface device. The pairing command sent to the voice interface device may also indicate the device identifier of the accessory device that is authorized for automated temporary device pairing.

At block 614, the process 600 may include determining whether pairing confirmation has been received. For example, the voice interface device may send a pairing event indicating that the pairing was performed successfully to the system, which may communicate the pairing to the enterprise system. This pairing event may indicate that communications between the accessory device and the voice interface device, and/or the accessory device with one or more devices and systems (including the system and/or the enterprise system) are authorized.

In examples where pairing confirmation has not been received, the process 600 may include, at block 616, the system may retry automated pairing. The retry attempt may be performed at predefined intervals and/or for a predefined amount of time. In examples, the system may additionally, or alternatively, cause output of pairing instructions. In this example, automated temporary device connection may not be available for the devices at issue and/or for the enterprise system at issue. As such, pairing instructions, which may be considered default pairing instructions may be output. Such instructions may be output on the voice interface device via a display of the voice interface device and/or audibly via a speaker of the voice interface device. The instructions may additionally or alternatively be output by the accessory device and/or by a personal device associated with the user, such as a phone.

In examples where pairing confirmation has been received, the process 600 may include, at block 618, enabling communications between the enterprise system and the accessory device(s). For example, the voice interface device may send a pairing event indicating that the pairing was performed successfully to the system, which may communicate the pairing to the enterprise system. This pairing event may indicate that communications between the accessory device and the voice interface device, and/or the accessory device with one or more devices and systems (including the system and/or the enterprise system) are authorized.

FIG. 7 illustrates a flow diagram of an example process 700 for automated temporary device connectivity. The order in which the operations or steps are described is not intended to be construed as a limitation, and any number of the described operations may be combined in any order and/or in parallel to implement process 700. In examples, the operations performed with respect to FIG. 7 may be performed by the system 104 described with respect to FIG. 1, above.

At block 702, the process 700 may include receiving, prior to a user entering an environment with a voice interface device disposed therein, a first request for an accessory device be associated with the voice interface device, the first request including a first identifier of the accessory device. For example, a trigger event may be determined for associating a given voice interface device with the accessory device. Utilizing a hotel enterprise as a nonlimiting example, a user may have reserved a room at a hotel. During a check in process, the user may check in for the reserved room (which may be considered the trigger event), receive keys and/or key codes to enter the room, and may otherwise be engaged in acquiring entry to the hotel room. In some examples, the user may have the accessory device that is associated with the enterprise system (in this example a hotel enterprise), with voice interface devices located in the hotel rooms, and/or with other systems that are associated with the enterprise system of the hotel.

In a nonlimiting example, a front-desk clerk or other employee of the enterprise system may assist the user with the check in process and as part of that process may scan or otherwise acquire a device identifier for the accessory device at issue. The device identifier may be associated with the environment (here the hotel room) that the user is associated with. It should be understood that other ways of acquiring the device identifier of the accessory device may also, or alternatively, be used. It should be understood that while a check in event is described herein as an example trigger event, this disclosure includes any trigger event that indicates the accessory device may be associated with the voice interface device. Examples may include, when the accessory device is purchased, when the hotel room is reserved, when a user acquires keys to a rental car, when a user enters a work environment, and/or any other trigger event.

Once the device identifier is associated with the environment at issue, a device utilized by the enterprise system employee may send data representing a check in event (or otherwise a trigger event) to the enterprise system, which in examples may be remote from the device that the employee is utilizing. The enterprise system may receive the check in event and may send the check in event to the system.

At block 704, the process 700 may include generating a second request for the voice interface device to be associated with the accessory device. For example, a pairing component may initiate processes for determining which voice interface device(s) are to be associated with the user and/or user account data associated with the user while the user is staying at the hotel and authorizing the accessory device to be paired with those voice interface device(s). For example, the pairing component may send a discovery request for the device identifiers of the voice interface device(s) to the discovery application. The discovery application, which may also be referred to herein as a discovery skill, may be an application that was developed in association with the enterprise system for at least pairing purposes and generally for other purposes as well, such as determining responses to voice commands received at the voice interface device(s) associated with the enterprise system. The discovery application may receive the discovery request, which may include the device identifier of the accessory device.

At block 706, the process 700 may include sending the second request to an enterprise system associated with the environment, the second request causing the enterprise system to identify a second identifier of the voice interface device based on an association, as maintained by the enterprise system, between the user and the environment. For example, the discovery application may utilize the discovery request to generate and send a query for association data to the enterprise system. The query for association data may include a request for the device identifiers of the voice interface device(s) that the user is authorized to be associated with during the user's stay at the environment in question. In examples, these authorized voice interface device(s) may be the voice interface device(s) that are situated within the hotel room that the user reserved, conference rooms that the user has booked, and/or voice interface device(s) located in environments that the user has an association with.

At block 708, the process 700 may include receiving the second identifier of the voice interface device from the enterprise system. For example, the enterprise system may return the requested association data to the discovery application. The association data may indicate the device identifiers of the authorized voice interface device(s) as well as, in examples, details associated with the authorization. These details may indicate restrictions and/or limits on how the accessory device is authorized to be associated with the voice interface device(s), such as time limits for the authorization, conditions that are to be detected before pairing can occur, etc. The discovery application may generate a discovery response to the discovery request that includes the device identifiers of the voice interface device(s) and the details associated with authorization of the voice interface device(s), when known.

At block 710, the process 700 may include authorizing the first identifier of the accessory device to be associated with the second identifier of the voice interface device for pairing purposes. For example, the pairing component may receive the discovery response and may generate an association between the device identifier of the accessory device with the device identifiers of the voice interface device(s) in a device association database maintained by the system. The device association database may indicate authorized associations between accessory devices and voice interface devices for at least pairing purposes as described herein. At this point, automated temporary device pairing may be authorized for the specific accessory device at issue and the specific voice interface device(s) at issue, and this authorization for automated temporary device pairing may be performed prior to the user entering the environment with the voice interface device(s) or otherwise before a user would typically interact with the voice interface device(s).

At block 712, the process 700 may include receiving a notification that the accessory device is within a threshold range of the voice interface device in the environment. In the hotel example, the user may move from a front desk area of the hotel to the room that the user reserved for the user's stay at the hotel. In a rental car example, the user may move from a front desk area and/or check in area for renting a vehicle to where the vehicle is parked. As the user moves, the accessory device may be configured to emit a beacon or otherwise a signal that identifies the accessory device and may be received by voice interface device. In examples the beacon may be sent utilizing a short range communication protocol such as Bluetooth®, BLE, etc. When the accessory device moves to within a threshold distance of a given voice interface device, the voice interface device may receive the beacon. Several examples of threshold distances are provided herein, but generally the threshold distance may be a distance associated with the environment in which the voice interface device is situated, such as when a user enters the hotel room, when a user enters a rented car, when a user enters a given conference room, when a user enters a certain area of a working environment, etc. As such, in examples, the threshold distance may be dynamic and may depend at least in part on the enterprise system at issue and/or the type of enterprise associated with the enterprise system. The threshold distance may be set by the enterprise system and/or by the system.

At block 714, the process 700 may include, based on the notification: sending a first command to the accessory device, the first command configured to cause the accessory device to enter a pairing mode and send a pairing request; and sending a second command to the voice interface device, the second command configured to cause the voice interface device to enter the pairing mode and accept the pairing request associated with the first identifier of the accessory device. For example, the pairing component may determine whether the accessory device is authorized to pair with the voice interface device based at least in part on whether an association between the accessory device and the voice interface device is present in the device association database. When authorized, the pairing component may generate and send a pairing command to the accessory device (which may be sent directly to the accessory device and/or to the accessory device via one or more other devices, such as the voice interface device and/or internet-based access points, for example). The pairing command may cause the pairing component of the accessory device to transition the accessory device to a pairing mode where the accessory device is caused to transmit a pairing request that is configured to be received by devices within a given range of the accessory device.

The pairing component of the system may also send a pairing command to the voice interface device. The pairing command sent to the voice interface device may cause the pairing component of the voice interface device to transition the voice interface device into the pairing mode as well, but the pairing mode of the voice interface device may be associated with receiving pairing requests (as opposed to transmitting pairing requests) from devices that are within a given range of the voice interface device. The pairing command sent to the voice interface device may also indicate the device identifier of the accessory device that is authorized for automated temporary device pairing.

At block 716, the process 700 may include receiving an indication that the voice interface device has been successfully paired to the accessory device. For example, the voice interface device may send a pairing event indicating that the pairing was performed successfully to the system, which may communicate the pairing to the enterprise system. This pairing event may indicate that communications between the accessory device and the voice interface device, and/or the accessory device with one or more devices and systems (including the system and/or the enterprise system) are authorized.

Additionally, or alternatively, the process 700 may include receiving an indication that the user is to be dissociated from the environment. The process 700 may also include causing, based on receiving the indication that the user is to be dissociated from the environment, the first identifier to be removed from a database of device identifiers that are associated with the enterprise system. The process 700 may also include sending a third command to the voice interface device, the third command causing the voice interface device to remove the first identifier of the accessory device from a list of paired devices with the voice interface device. The process 700 may also include sending a fourth command to the accessory device, the fourth command causing the accessory device to reset to a state that the accessory device was in prior to receiving the first request.

Additionally, or alternatively, the process 700 may include, based on receiving the indication that the voice interface device has been successfully paired to the accessory device, sending authorization data to the enterprise system, the authorization data enabling the enterprise system to communicate with the accessory device. The process 700 may also include receiving, from the enterprise system, an indication that the enterprise system has caused a state change to occur with respect to the accessory device utilizing the authorization data. The process 700 may also include causing a state database to indicate the state change.

Additionally, or alternatively, the process 700 may include determining that an application has been developed in association with the enterprise system, the application configured to at least perform pairing operations. The process 700 may also include sending the second request to the application, the application configured to communicate the second request to the enterprise system, and wherein receiving the second identifier of the voice interface device comprises receiving the second identifier of the voice interface device from the enterprise system utilizing the application.

FIG. 8 illustrates a flow diagram of another example process 800 for automated temporary device connectivity. The order in which the operations or steps are described is not intended to be construed as a limitation, and any number of the described operations may be combined in any order and/or in parallel to implement process 800. In examples, the operations performed with respect to FIG. 8 may be performed by the system 104 described with respect to FIG. 1, above.

At block 802, the process 800 may include receiving first data requesting that a first device be associated with a second device, the first data including a first identifier of the first device. For example, a trigger event may be determined for associating a given voice interface device (e.g., the second device) with the accessory device (e.g., the first device). Utilizing a hotel enterprise as a nonlimiting example, a user may have reserved a room at a hotel. During a check in process, the user may check in for the reserved room (which may be considered the trigger event), receive keys and/or key codes to enter the room, and may otherwise be engaged in acquiring entry to the hotel room. In some examples, the user may have the accessory device that is associated with the enterprise system (in this example a hotel enterprise), with voice interface devices located in the hotel rooms, and/or with other systems that are associated with the enterprise system of the hotel.

In a nonlimiting example, a front-desk clerk or other employee of the enterprise system may assist the user with the check in process and as part of that process may scan or otherwise acquire a device identifier for the accessory device at issue. The device identifier may be associated with the environment (here the hotel room) that the user is associated with. It should be understood that other ways of acquiring the device identifier of the accessory device may also, or alternatively, be used. It should be understood that while a check in event is described herein as an example trigger event, this disclosure includes any trigger event that indicates the accessory device may be associated with the voice interface device. Examples may include, when the accessory device is purchased, when the hotel room is reserved, when a user acquires keys to a rental car, when a user enters a work environment, and/or any other trigger event.

Once the device identifier is associated with the environment at issue, a device utilized by the enterprise system employee may send data representing a check in event (or otherwise a trigger event) to the enterprise system, which in examples may be remote from the device that the employee is utilizing. The enterprise system may receive the check in event and may send the check in event to the system.

At block 804, the process 800 may include generating second data requesting a second identifier of the second device to be associated with the first device. For example, a pairing component may initiate processes for determining which voice interface device(s) are to be associated with the user and/or user account data associated with the user while the user is staying at the hotel and authorizing the accessory device to be paired with those voice interface device(s). For example, the pairing component may send a discovery request for the device identifiers of the voice interface device(s) to the discovery application. The discovery application, which may also be referred to herein as a discovery skill, may be an application that was developed in association with the enterprise system for at least pairing purposes and generally for other purposes as well, such as determining responses to voice commands received at the voice interface device(s) associated with the enterprise system. The discovery application may receive the discovery request, which may include the device identifier of the accessory device.

At block 806, the process 800 may include sending the second data to an enterprise system, the second data causing the enterprise system to identify the second identifier based at least in part on an association between user account data and the first identifier as maintained by the enterprise system. For example, the discovery application may utilize the discovery request to generate and send a query for association data to the enterprise system. The query for association data may include a request for the device identifiers of the voice interface device(s) that the user is authorized to be associated with during the user's stay at the environment in question. In examples, these authorized voice interface device(s) may be the voice interface device(s) that are situated within the hotel room that the user reserved, conference rooms that the user has booked, and/or voice interface device(s) located in environments that the user has an association with.

At block 808, the process 800 may include receiving third data that includes the second identifier from the enterprise system. For example, the enterprise system may return the requested association data to the discovery application. The association data may indicate the device identifiers of the authorized voice interface device(s) as well as, in examples, details associated with the authorization. These details may indicate restrictions and/or limits on how the accessory device is authorized to be associated with the voice interface device(s), such as time limits for the authorization, conditions that are to be detected before pairing can occur, etc. The discovery application may generate a discovery response to the discovery request that includes the device identifiers of the voice interface device(s) and the details associated with authorization of the voice interface device(s), when known.

At block 810, the process 800 may include generating fourth data that authorizes the first identifier to be associated with the second identifier for pairing purposes. For example, the pairing component may receive the discovery response and may generate an association between the device identifier of the accessory device with the device identifiers of the voice interface device(s) in a device association database maintained by the system. The device association database may indicate authorized associations between accessory devices and voice interface devices for at least pairing purposes as described herein. At this point, automated temporary device pairing may be authorized for the specific accessory device at issue and the specific voice interface device(s) at issue, and this authorization for automated temporary device pairing may be performed prior to the user entering the environment with the voice interface device(s) or otherwise before a user would typically interact with the voice interface device(s).

At block 812, the process 800 may include receiving fifth data indicating that the first device is within a threshold range of the second device. In the hotel example, the user may move from a front desk area of the hotel to the room that the user reserved for the user's stay at the hotel. In a rental car example, the user may move from a front desk area and/or check in area for renting a vehicle to where the vehicle is parked. As the user moves, the accessory device may be configured to emit a beacon or otherwise a signal that identifies the accessory device and may be received by voice interface device. In examples the beacon may be sent utilizing a short range communication protocol such as Bluetooth®, BLE, etc. When the accessory device moves to within a threshold distance of a given voice interface device, the voice interface device may receive the beacon. Several examples of threshold distances are provided herein, but generally the threshold distance may be a distance associated with the environment in which the voice interface device is situated, such as when a user enters the hotel room, when a user enters a rented car, when a user enters a given conference room, when a user enters a certain area of a working environment, etc. As such, in examples, the threshold distance may be dynamic and may depend at least in part on the enterprise system at issue and/or the type of enterprise associated with the enterprise system. The threshold distance may be set by the enterprise system and/or by the system.

At block 814, the process 800 may include, based at least in part on the fifth data: sending a first command to the first device, the first command configured to cause the first device to enter a pairing mode and send a pairing request; and sending a second command to the second device, the second command configured to cause the second device to enter the pairing mode and accept the pairing request associated with the first identifier. For example, the pairing component may determine whether the accessory device is authorized to pair with the voice interface device based at least in part on whether an association between the accessory device and the voice interface device is present in the device association database. When authorized, the pairing component may generate and send a pairing command to the accessory device (which may be sent directly to the accessory device and/or to the accessory device via one or more other devices, such as the voice interface device and/or internet-based access points, for example). The pairing command may cause the pairing component of the accessory device to transition the accessory device to a pairing mode where the accessory device is caused to transmit a pairing request that is configured to be received by devices within a given range of the accessory device.

Additionally, or alternatively, the process 800 may include receiving sixth data indicating that the user account data is to be dissociated from the enterprise system. The process 800 may also include causing, based at least in part on receiving the sixth data, the first identifier to be removed from a database of device identifiers that are associated with the enterprise system. The process 800 may also include sending a third command to the second device, the third command causing the second device to remove the first identifier from a list of paired devices with the second device. The process 800 may also include sending a fourth command to the first device, the fourth command causing the first device to reset to a state that the first device was in prior to receiving the first data.

Additionally, or alternatively, the process 800 may include receiving sixth data indicating that the second device has been successfully paired to the first device. The process 800 may also include, based at least in part on the sixth data, sending authorization data to the enterprise system, the authorization data enabling the enterprise system to communicate with the first device. The process 800 may also include receiving, from the enterprise system, seventh data indicating that the enterprise system has caused a state change to occur with respect to the first device. The process 800 may also include causing a state database to indicate the state change.

Additionally, or alternatively, the process 800 may include determining that an application has been developed in association with the enterprise system. The process 800 may also include sending the second data to the application, the application configured to communicate the second data to the enterprise system, and wherein receiving the second identifier of the second device comprises receiving the second identifier from the enterprise system utilizing the application.

Additionally, or alternatively, the process 800 may include determining that a third device is associated with an environment of the second device. The process 800 may also include determining that the first device has been successfully paired with the second device. The process 800 may also include, based at least in part on the third device being associated with the environment and the first device successfully being paired with the second device, sending a third command to the third device, the third command causing the third device to enter the pairing mode and accept the pairing request associated with the first identifier.

Additionally, or alternatively, the process 800 may include receiving sixth data indicating that a third device having a device type of the first device has been associated with the user account data. The process 800 may also include, based at least in part on the third device having the device type and being associated with the user account data, causing the second device to pair with the third device when the third device is within the threshold range of the second device.

Additionally, or alternatively, the process 800 may include the first device being a wearable device. The process 800 may also include the second device being a voice interface device situated in a hotel room. The process 800 may also include the enterprise system being associated with a hotel. The process 800 may also include receiving the first data based at least in part on an indication that a user has checked in to the hotel room.

Additionally, or alternatively, the process 800 may include the first device being a phone. The process 800 may also include the second device being a vehicle. The process 800 may also include receiving the first data based at least in part on an indication that a user has rented the vehicle.

Figure 9:
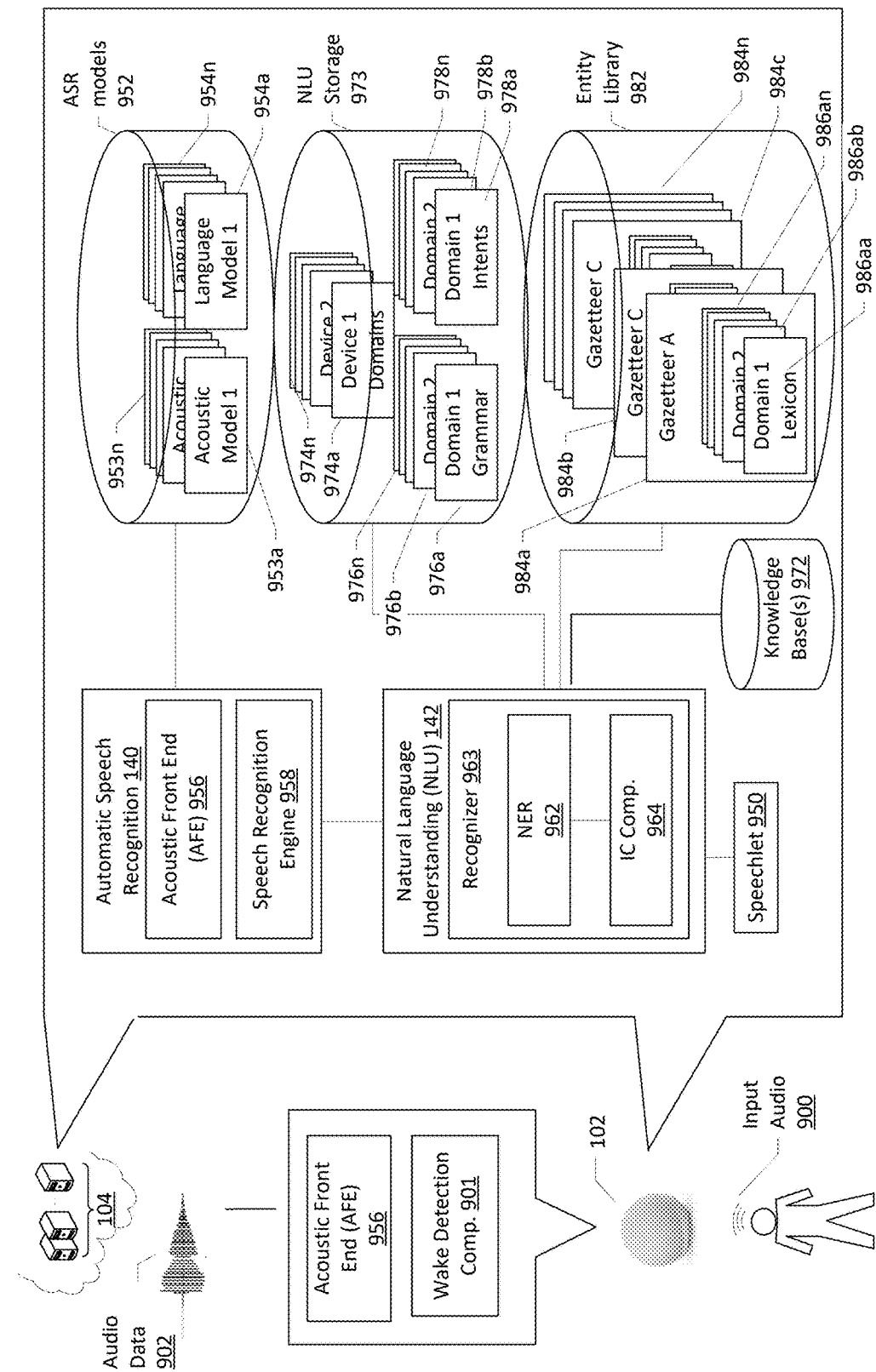
FIG. 9 illustrates a conceptual diagram of components of a speech-processing system for processing audio data provided by one or more devices.

FIG. 9 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin processing audio data). The various components illustrated may be located on a same device or different physical devices. Message between various components illustrated in FIG. 9 may occur directly or across a network 106. An audio capture component, such as a microphone 114 of the device 102, or another device, captures audio 900 corresponding to a spoken utterance. The device 102, using a wake word engine 901, then processes audio data corresponding to the audio 900 to determine if a keyword (such as a wakeword) is detected in the audio data. Following detection of a wakeword, the device 102(a) processes audio data 902 corresponding to the utterance utilizing an ASR component 140. The audio data 902 may be output from an optional acoustic front end (AFE) 956 located on the device prior to transmission. In other instances, the audio data 902 may be in a different form for processing by a remote AFE 956, such as the AFE 956 located with the ASR component 140.

The wake word engine 901 works in conjunction with other components of the user device, for example a microphone to detect keywords in audio 900. For example, the device may convert audio 900 into audio data, and process the audio data with the wake word engine 901 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input: the energy levels of the audio input in one or more spectral bands: the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 901 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 901 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the device 102 may "wake." The audio data 902 may include data corresponding to the wakeword. Further, a local device may "wake" upon detection of speech/spoken audio above a threshold, as described herein. An ASR component 140 may convert the audio data 902 into text. The ASR transcribes audio data into text data representing the words of the speech contained in the audio data 902. The text data may then be used by other components for various purposes, such as executing system commands, inputting data, etc. A spoken utterance in the audio data is input to a processor configured to perform ASR which then interprets the utterance based on the similarity between the utterance and pre-established language models 954 stored in an ASR model knowledge base (ASR Models Storage 952). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 953 stored in an ASR Models Storage 952), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 140 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 956 and a speech recognition engine 958. The acoustic front end (AFE) 956 transforms the audio data from the microphone into data for processing by the speech recognition engine 958. The speech recognition engine 958 compares the speech recognition data with acoustic models 953, language models 954, and other data models and information for recognizing the speech conveyed in the audio data. The AFE 956 may reduce noise in the audio data and divide the digitized audio data into frames representing time intervals for which the AFE 956 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 958 may process the output from the AFE 956 with reference to information stored in speech/model storage (952). Alternatively, post front-end processed data (such as feature vectors) may be received by the device executing ASR processing from another source besides the internal AFE. For example, the user device may process audio data into feature vectors (for example using an on-device AFE 956).

The speech recognition engine 958 attempts to match received feature vectors to language phonemes and words as known in the stored acoustic models 953 and language models 954. The speech recognition engine 958 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, what time is the pool open until" The wake detection component may identify the wake word, otherwise described as a trigger expression, "Alexa," in the user utterance and may "wake" based on identifying the wake word. The speech recognition engine 958 may identify, determine, and/or generate text data corresponding to the user utterance, here "what time is the pool open until."

The speech recognition engine 958 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 958 to other processing components, which may be local to the device performing ASR and/or distributed across the network(s). For example, ASR results in the form of a single textual representation of the speech, an N-best list including multiple hypotheses and respective scores, lattice, etc. may be utilized, for natural language understanding (NLU) processing, such as conversion of the text into commands for execution, by the user device and/or by another device (such as a server running a specific application like a search engine, etc.).

The device performing NLU processing 142 may include various components, including potentially dedicated processor(s), memory, storage, etc. As shown in FIG. 9, an NLU component 142 may include a recognizer 963 that includes a named entity recognition (NER) component 962 which is used to identify portions of query text that correspond to a named entity that may be recognizable by the system. A downstream process called named entity resolution links a text portion to a specific entity known to the system. To perform named entity resolution, the system may utilize gazetteer information (984a-984n) stored in entity library storage 982. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 140 based on the utterance input audio 900) and attempts to make a semantic interpretation of the text. That is, the NLU process determines the meaning behind the text based on the individual words and then implements that meaning. NLU processing 142 interprets a text string to derive an intent or a desired action from the user as well as the pertinent pieces of information in the text that allow a device (e.g., device 102) to complete that action. For example, if a spoken utterance is processed using ASR 140 and outputs the text "what time is the pool open until" the NLU process may determine that the user intended to receive a response to the voice command indicating a time when the pool of the enterprise entity closes.

The NLU 142 may process several textual inputs related to the same utterance. For example, if the ASR 140 outputs N text segments (as part of an N-best list), the NLU may process all N outputs to obtain NLU results.

As will be discussed further below, the NLU process may be configured to parse and tag to annotate text as part of NLU processing. For example, for the text "what time is the pool open until," "what time" may be tagged as a command (to determine a time to respond to the user with).

To correctly perform NLU processing of speech input, an NLU process 142 may be configured to determine a "domain" of the utterance so as to determine and narrow down which services offered by the endpoint device may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 962 receives a query in the form of ASR results and attempts to identify relevant grammars and lexical information that may be used to construe meaning. To do so, the NLU component 142 may begin by identifying potential domains that may relate to the received query. The NLU storage 973 includes a database of devices (974a-974n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," health care," "smart home," "communications," "shopping." "music," "calendaring." etc. As such, each domain may be associated with a particular recognizer 963, language model and/or grammar database (976a-976n), a particular set of intents/actions (978a-978n), and a particular personalized lexicon (986). Each gazetteer (984a-984n) may include domain-indexed lexical information associated with a particular user and/or device. For example, the Gazetteer A (984a) includes domain-index lexical information 986aa to 986an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 964 parses the query to determine an intent or intents for each identified domain, where the intent corresponds to the action to be performed that is responsive to the query. Each domain is associated with a database (978a-978n) of words linked to intents. For example, a communications intent database may link words and phrases such as "identify song." "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 964 identifies potential intents for each identified domain by comparing words in the query to the words and phrases in the intents database 978. In some instances, the determination of an intent by the IC component 964 is performed using a set of rules or templates that are processed against the incoming text to identify a matching intent.

In order to generate a particular interpreted response, the NER 962 applies the grammar models and lexical information associated with the respective domain to actually recognize a mention of one or more entities in the text of the query. In this manner, the NER 962 identifies "slots" or values (i.e., particular words in query text) that may be needed for later command processing. Depending on the complexity of the NER 962, it may also label each slot with a type of varying levels of specificity (such as noun, place, device name, device location, city, artist name, song name, amount of time, timer number, or the like). Each grammar model 976 includes the names of entities (i.e., nouns) commonly found in speech about the particular domain (i.e., generic terms), whereas the lexical information 986 from the gazetteer 984 is personalized to the user(s) and/or the device. For instance, a grammar model associated with the shopping domain may include a database of words commonly used when people discuss shopping.

The intents identified by the IC component 964 are linked to domain-specific grammar frameworks (included in 976) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (976) framework or frameworks may correspond to sentence structures such as "purchase item called 'Item A' from Marketplace A."

For example, the NER component 962 may parse the query to identify words as subject, object, verb, preposition, etc., based on grammar rules and/or models, prior to recognizing named entities. The identified verb may be used by the IC component 964 to identify intent, which is then used by the NER component 962 to identify frameworks. A framework for the intent of "play a song," meanwhile, may specify a list of slots/fields applicable to play the identified "song" and any object modifier (e.g., specifying a music collection from which the song should be accessed) or the like. The NER component 962 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazetteer for similarity with the framework slots. If the search of the gazetteer does not resolve the slot/field using gazetteer information, the NER component 962 may search the database of generic words associated with the domain (in the knowledge base 972). So, for instance, if the query was "identify this song," after failing to determine which song is currently being output, the NER component 962 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a speechlet 950. The destination speechlet 950 may be determined based on the NLU output. For example, if the NLU output includes a command to send a message, the destination speechlet 950 may be a message sending application, such as one located on the user device or in a message sending appliance, configured to execute a message sending command. If the NLU output includes a search request, the destination application may include a search engine processor, such as one located on a search server, configured to execute a search command. After the appropriate command is generated based on the intent of the user, the speechlet 950 may provide some or all of this information to a text-to-speech (TTS) engine. The TTS engine may then generate an actual audio file for outputting the audio data determined by the application (e.g., "okay," or "the pool closes at 10:00 pm").

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 142 during runtime operations where NLU operations are performed on text (such as text output from an ASR component 140). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 963. Each recognizer may include various NLU components such as an NER component 962, IC component 964 and other components such as an entity resolver, or other components.

For example, a messaging domain recognizer 963-A (Domain A) may have an NER component 962-A that identifies what slots (i.e., portions of input text) may correspond to particular words relevant to that domain. The words may correspond to entities such as (for the messaging domain) a recipient. An NER component 962 may use a machine learning model, such as a domain specific conditional random field (CRF) to both identify the portions corresponding to an entity as well as identify what type of entity corresponds to the text portion. The messaging domain recognizer 963-A may also have its own intent classification (IC) component 964-A that determines the intent of the text assuming that the text is within the proscribed domain. An IC component may use a model, such as a domain specific maximum entropy classifier to identify the intent of the text, where the intent is the action the user desires the system to perform. For this purpose, device 102 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the system, as illustrated herein are exemplary, and may be located in a stand-alone device or may be included, in whole or in part, as a component of a larger device or system, may be distributed across a network or multiple devices connected by a network, etc.

Figure 10:
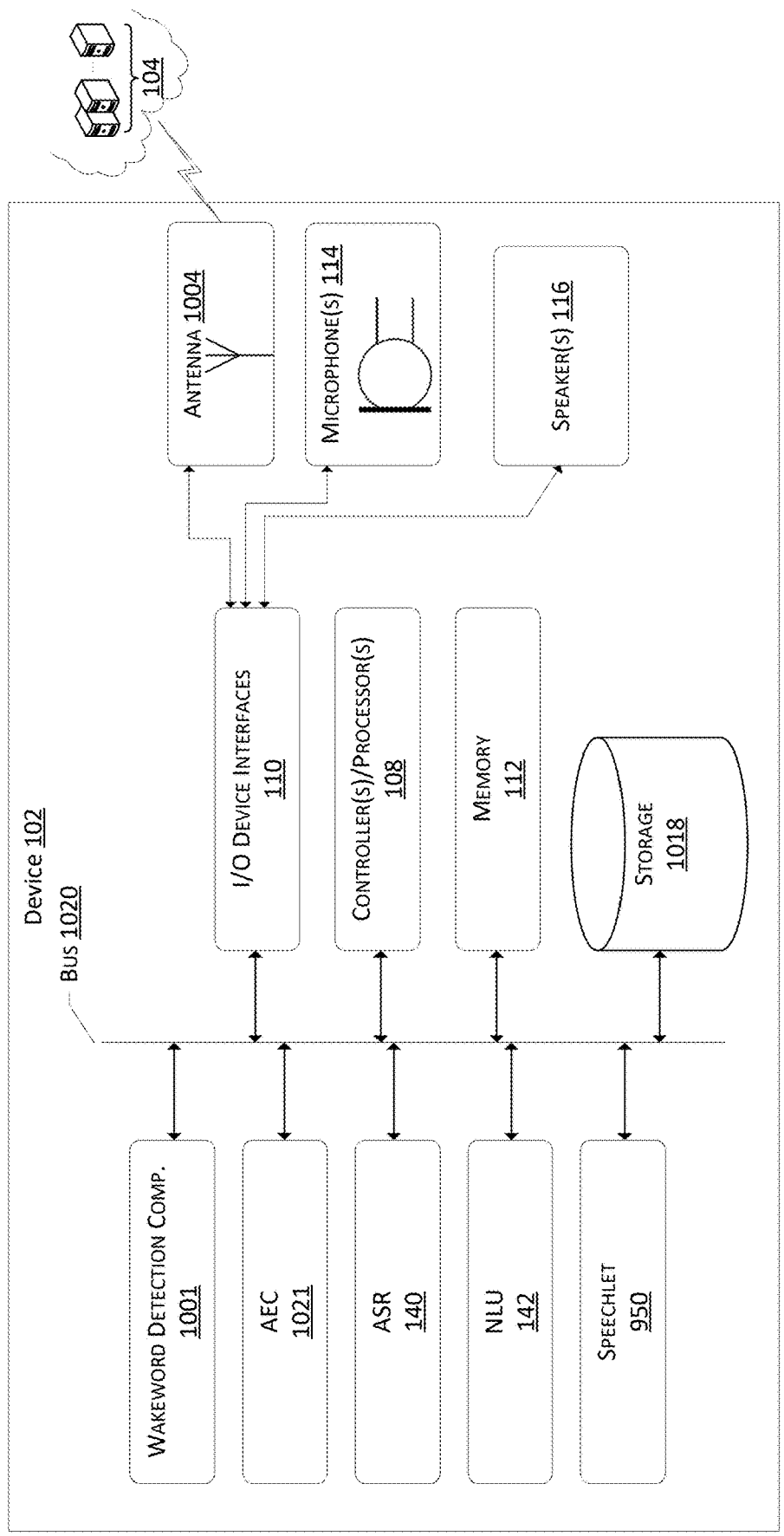
FIG. 10 illustrates a conceptual diagram of components of an example device that may utilized in association with enterprise type models for voice interfaces.

FIG. 10 illustrates a conceptual diagram of components of an example connected device from which sensor data may be received for device functionality control utilizing activity prediction. For example, the device may include one or more electronic devices such as voice interface devices (e.g., smart speaker devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These electronic devices may be situated in a home associated with the first user profile, in a place a business, healthcare facility (e.g., hospital, doctor's office, pharmacy, etc.), in vehicle (e.g., airplane, truck, car, bus, etc.) in a public forum (e.g., shopping center, store, etc.), for example. A second user profile may also be associated with one or more other electronic devices, which may be situated in home or other place associated with the second user profile, for example. The device 102 may be implemented as a standalone device that is relatively simple in terms of functional capabilities with limited input/output components, memory, and processing capabilities. For instance, the device 102 may not have a keyboard, keypad, touchscreen, or other form of mechanical input. In some instances, the device 102 may include a microphone 114, a power source, and functionality for sending generated audio data via one or more antennas 1004 to another device and/or system.

The device 102 may also be implemented as a more sophisticated computing device, such as a computing device similar to, or the same as, a smart phone or personal digital assistant. The device 102 may include a display with a touch interface and various buttons for providing input as well as additional functionality such as the ability to send and receive communications. Alternative implementations of the device 102 may also include configurations as a personal computer. The personal computer may include input devices such as a keyboard, a mouse, a touchscreen, and other hardware or functionality that is found on a desktop, notebook, netbook, or other personal computing devices. In examples, the device 102 may include an automobile, such as a car. In other examples, the device 102 may include a pin on a user's clothes or a phone on a user's person. In examples, the device 102 and may not include speaker(s) and may utilize speaker(s) of an external or peripheral device to output audio via the speaker(s) of the external/peripheral device. In this example, the device 102 might represent a set-top box (STB), and the device 102 may utilize speaker(s) of another device such as a television that is connected to the STB for output of audio via the external speakers. In other examples, the device 102 may not include the microphone(s) 114, and instead, the device 102 can utilize microphone(s) of an external or peripheral device to capture audio and/or generate audio data. In this example, the device 102 may utilize microphone(s) of a headset that is coupled (wired or wirelessly) to the device 102. These types of devices are provided by way of example and are not intended to be limiting, as the techniques described in this disclosure may be used in essentially any device that has an ability to recognize speech input or other types of natural language input.

The device 102 of FIG. 10 may include one or more controllers/processors 108, that may include a central processing unit (CPU) for processing data and computer-readable instructions, and memory 112 for storing data and instructions of the device 102. In examples, the skills and/or applications described herein may be stored in association with the memory 112, which may be queried for content and/or responses as described herein. The device 102 may also be connected to removable or external non-volatile memory and/or storage, such as a removable memory card, memory key drive, networked storage, etc., through input/output device interfaces 110.

Computer instructions for operating the device 102 and its various components may be executed by the device's controller(s)/processor(s) 108, using the memory 112 as "working" storage at runtime. A device's computer instructions may be stored in a non-transitory manner in non-volatile memory 112, storage 1018, or an external device(s). Alternatively, some or all of the executable instructions may be embedded in hardware or firmware on the device 102 in addition to or instead of software.

The device 102 may include input/output device interfaces 110. A variety of components may be connected through the input/output device interfaces 110. Additionally, the device 102 may include an address/data bus 1020 for conveying data among components of the respective device. Each component within a device 102 may also be directly connected to other components in addition to, or instead of, being connected to other components across the bus 1020.

The device 102 may include a display, which may comprise a touch interface. Any suitable display technology, such as liquid crystal display (LCD), organic light emitting diode (OLED), electrophoretic, and so on, may be utilized for the displays. Furthermore, the processor(s) 108 may comprise graphics processors for driving animation and video output on the associated display. As a way of indicating to a user that a connection between another device has been opened, the device 102 may be configured with one or more visual indicators, such as the light element(s), which may be in the form of LED(s) or similar components (not illustrated), that may change color, flash, or otherwise provide visible light output, such as for a notification indicator on the device 102. The input/output device interfaces 110 that connect to a variety of components. This wired or a wireless audio and/or video port may allow for input/output of audio/video to/from the device 102. The device 102 may also include an audio capture component. The audio capture component may be, for example, a microphone 114 or array of microphones, a wired headset or a wireless headset, etc. The microphone 114 may be configured to capture audio. If an array of microphones is included, approximate distance to a sound's point of origin may be determined using acoustic localization based on time and amplitude differences between sounds captured by different microphones of the array. The device 102 (using microphone 114, wakeword detection component 1001, ASR component 140, etc.) may be configured to generate audio data corresponding to captured audio. The device 102 (using input/output device interfaces 110, antenna 1004, etc.) may also be configured to transmit the audio data to the remote system 104 for further processing or to process the data using internal components such as a wakeword detection component 1001.

Via the antenna(s) 1004, the input/output device interface 110 may connect to one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 102 via wired connection to an external alternating current (AC) outlet, and/or via onboard power sources, such as batteries, solar panels, etc.

Through the network(s), the system may be distributed across a networked environment. Accordingly, the device 102 and/or the system 104 may include an ASR component 140. The ASR component 140 of device 102 may be of limited or extended capabilities. The ASR component 140 may include language models stored in ASR model storage component, and an ASR component 140 that performs automatic speech recognition. If limited speech recognition is included, the ASR component 140 may be configured to identify a limited number of words, such as keywords detected by the device, whereas extended speech recognition may be configured to recognize a much larger range of words.

The device 102 and/or the system 104 may include a limited or extended NLU component 142. The NLU component 142 of device 102 may be of limited or extended capabilities. The NLU component 142 may comprise a name entity recognition module, an intent classification module and/or other components. The NLU component 142 may also include a stored knowledge base and/or entity library, or those storages may be separately located.

In examples, AEC may also be performed by the device 102. In these examples, the operations may include causing the AEC component 1021 to be enabled or otherwise turned on, or the operations may include causing the AEC component 1021 to transition from a first mode to a second mode representing a higher sensitivity to audio data generated by the microphone 114. The AEC component 1021 may utilize the audio data generated by the microphone 114 to determine if an audio fingerprint of the audio data, or portion thereof, corresponds to a reference audio fingerprint associated with the predefined event.

The device 102 and/or the system 104 may also include a speechlet 950 that is configured to execute commands/functions associated with a spoken command as described herein. The device 102 may include a wakeword detection component 901, which may be a separate component or may be included in an ASR component 140. The wakeword detection component 901 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102(a) may be configured collectively to identify a set of the directional audio signals in which the wake expression is detected or in which the wake expression is likely to have occurred.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system, comprising:
one or more processors; and
non-transitory computer-readable media storing computer-executable instructions that, when executed by the one or more processors, cause the one or more processors to perform operations comprising:
receiving, prior to a user entering an environment with a voice interface device located therein and from an enterprise device associated with an enterprise system, a first request for an accessory device to be associated with the voice interface device, the first request including a first identifier of the accessory device;
generating a second request for the voice interface device to be associated with the accessory device:
sending the second request to the enterprise system associated with the environment, the second request causing the enterprise system to identify a second identifier of the voice interface device based on an association, as maintained by the enterprise system, between the user and the environment;
receiving, from the enterprise system, the second identifier of the voice interface device;
authorizing the first identifier of the accessory device to be associated with the second identifier of the voice interface device for pairing purposes;
receiving, from the voice interface device, a notification that the accessory device is within a threshold range of the voice interface device in the environment;
based on the notification:
sending a first command to the accessory device, the first command configured to cause the accessory device to enter a pairing mode and send a pairing request; and
sending a second command to the voice interface device, the second command configured to cause the voice interface device to enter the pairing mode and accept the pairing request associated with the first identifier of the accessory device; and
receiving, from the voice interface device, an indication that the voice interface device has been successfully paired to the accessory device.

2. The system of claim 1, the operations further comprising:
receiving, from the enterprise system, an indication that the user is to be dissociated from the environment;
causing, based on receiving the indication that the user is to be dissociated from the environment, the first identifier to be removed from a database of device identifiers that are associated with the enterprise system;
sending a third command to the voice interface device, the third command causing the voice interface device to remove the first identifier of the accessory device from a list of paired devices with the voice interface device; and
sending a fourth command to the accessory device, the fourth command causing the accessory device to reset to a state that the accessory device was in prior to receiving the first request.

3. The system of claim 1, the operations further comprising:
based on receiving the indication that the voice interface device has been successfully paired to the accessory device, sending authorization data to the enterprise system, the authorization data enabling the enterprise system to communicate with the accessory device;
receiving, from the enterprise system, an indication that the enterprise system has caused a state change to occur with respect to the accessory device utilizing the authorization data; and
causing a state database to indicate the state change.

4. The system of claim 1, the operations further comprising:
determining that an application has been developed in association with the enterprise system, the application configured to at least perform pairing operations; and
sending the second request to the application, the application configured to communicate the second request to the enterprise system, and wherein receiving the second identifier of the voice interface device comprises receiving the second identifier of the voice interface device from the enterprise system utilizing the application.

5. A method, comprising:
receiving, from an enterprise device associated with an enterprise system, first data requesting that a first device be associated with a second device, the first data including a first identifier of the first device;
generating second data requesting a second identifier of the second device to be associated with the first device;

sending the second data to the enterprise system, the second data causing the enterprise system to identify the second identifier based at least in part on an association between user account data and the first identifier as maintained by the enterprise system;

receiving, from the enterprise system, third data that includes the second identifier;

generating fourth data that authorizes the first identifier to be associated with the second identifier for pairing purposes;

receiving, from the second device, fifth data indicating that the first device is within a threshold range of the second device; and based at least in part on the fifth data:
   sending a first command to the first device, the first command configured to cause the first device to enter a pairing mode and send a pairing request; and
   sending a second command to the second device, the second command configured to cause the second device to enter the pairing mode and accept the pairing request associated with the first identifier.

6. The method of claim 5, further comprising:
receiving, from the enterprise system, sixth data indicating that the user account data is to be dissociated from the enterprise system;
causing, based at least in part on receiving the sixth data, the first identifier to be removed from a database of device identifiers;
sending a third command to the second device, the third command causing the second device to remove the first identifier from a list of paired devices with the second device; and
sending a fourth command to the first device, the fourth command causing the first device to reset to a state that the first device was in prior to receiving the first data.

7. The method of claim 5, further comprising:
receiving, from the second device, sixth data indicating that the second device has been successfully paired to the first device;
based at least in part on the sixth data, sending authorization data to the enterprise system, the authorization data enabling the enterprise system to communicate with the first device;
receiving, from the enterprise system, seventh data indicating that the enterprise system has caused a state change to occur with respect to the first device; and
causing a state database to indicate the state change.

8. The method of claim 5, further comprising:
determining that an application has been developed in association with the enterprise system; and
sending the second data to the application, the application configured to communicate the second data to the enterprise system, and wherein receiving the second identifier of the second device comprises receiving the second identifier from the enterprise system utilizing the application.

9. The method of claim 5, further comprising:
determining that a third device is associated with an environment of the second device;
determining that the first device has been successfully paired with the second device; and
based at least in part on the third device being associated with the environment and the first device successfully being paired with the second device, sending a third command to the third device, the third command causing the third device to enter the pairing mode and accept the pairing request associated with the first identifier.

10. The method of claim 5, further comprising:
receiving, from the enterprise system, sixth data indicating that a third device having a device type of the first device has been associated with the user account data; and
based at least in part on the third device having the device type and being associated with the user account data, causing the second device to pair with the third device when the third device is within the threshold range of the second device.

11. The method of claim 5, wherein:
the first device is a wearable device;
the second device is a voice interface device situated in a hotel room;
the enterprise system is associated with a hotel; and
receiving the first data from the enterprise device is based at least in part on an indication that a user has checked in to the hotel room.

12. The method of claim 5, wherein:
the first device is a phone;
the second device is a vehicle; and
receiving the first data from the enterprise device is based at least in part on an indication that a user has rented the vehicle.

13. A system, comprising:
one or more processors; and
non-transitory computer-readable media storing computer-executable instructions that, when executed by the one or more processors, cause the one or more processors to perform operations comprising:
   receiving, from an enterprise device associated with an enterprise system and based at least in part on a trigger event occurring, first data requesting that a first device be associated with a second device, the first data including a first identifier of the first device;
   generating second data requesting a second identifier of the second device to be associated with the first device;
   sending the second data to the enterprise system, the second data causing the enterprise system to identify the second identifier based at least in part on an association between user account data and the first identifier as maintained by the enterprise system;
   receiving, from the enterprise system, third data that includes the second identifier;
   generating fourth data that authorizes the first identifier to be associated with the second identifier for pairing purposes;
   receiving, from the second device, fifth data indicating that the first device has moved within a threshold range of the second device; and
   based at least in part on the fifth data:
      sending a first command to the first device, the first command configured to cause the first device to enter a pairing mode and send a pairing request; and
      sending a second command to the second device, the second command configured to cause the second device to enter the pairing mode and accept the pairing request associated with the first identifier.

14. The system of claim 13, the operations further comprising:
- receiving, from the enterprise system, sixth data indicating that the user account data is to be dissociated from the enterprise system;
- causing, based at least in part on receiving the sixth data, the first identifier to be removed from a database of device identifiers that are associated with the enterprise system;
- sending a third command to the second device, the third command causing the second device to remove the first identifier from a list of paired devices with the second device; and
- sending a fourth command to the first device, the fourth command causing the first device to reset to a state that the first device was in prior to receiving the first data.

15. The system of claim 13, the operations further comprising:
- receiving, from the second device, sixth data indicating that the second device has been successfully paired to the first device;
- based at least in part on the sixth data, sending authorization data to the enterprise system, the authorization data enabling the enterprise system to communicate with the first device;
- receiving, from the enterprise system, seventh data indicating that the enterprise system has caused a state change to occur with respect to the first device; and
- causing a state database to indicate the state change.

16. The system of claim 13, the operations further comprising:
- determining that an application has been developed in association with the enterprise system; and
- sending the second data to the application, the application configured to communicate the second data to the enterprise system, and wherein receiving the second identifier of the second device comprises receiving the second identifier from the enterprise system utilizing the application.

17. The system of claim 13, the operations further comprising:
- determining that a third device is associated with an environment of the second device;
- determining that the first device has been successfully paired with the second device; and
- based at least in part on the third device being associated with the environment and the first device successfully being paired with the second device, sending a third command to the third device, the third command causing the third device to enter the pairing mode and accept the pairing request associated with the first identifier.

18. The system of claim 13, the operations further comprising:
- receiving, from the enterprise system, sixth data indicating that a third device having a device type of the first device has been associated with the user account data; and
- based at least in part on the third device having the device type and being associated with the user account data, causing the second device to pair with the third device when the third device moves to within the threshold range of the second device.

19. The system of claim 13, wherein:
the first device is a wearable device;
the second device is a voice interface device situated in a hotel room;
the enterprise system is associated with a hotel; and
the trigger event is an indication that a user has checked in to the hotel room.

20. The system of claim 13, wherein:
the first device is a phone;
the second device is a vehicle; and
the trigger event is an indication that a user has rented the vehicle.

* * * * *